(12) United States Patent
Fujita

(10) Patent No.: US 7,130,084 B2
(45) Date of Patent: Oct. 31, 2006

(54) ELECTROPHOTOGRAPHIC APPARATUS AND IMAGE PROCESSING PROGRAM

(75) Inventor: Toru Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1063 days.

(21) Appl. No.: 10/058,110

(22) Filed: Jan. 29, 2002

(65) Prior Publication Data

US 2002/0114012 A1 Aug. 22, 2002

(30) Foreign Application Priority Data

Jan. 29, 2001 (JP) .......................... P2001-019855
Feb. 2, 2001 (JP) .......................... P2001-026947

(51) Int. Cl.
*H04N 1/405* (2006.01)
*H04N 1/409* (2006.01)
*H04N 1/29* (2006.01)

(52) U.S. Cl. .................. 358/3.06; 358/3.12; 358/3.26; 358/300

(58) Field of Classification Search ................ 358/1.9, 358/3.01, 3.02, 3.06, 3.26, 3.09–3.12, 520, 358/534–536, 300

See application file for complete search history.

(56) References Cited

U.S. PATENT DOCUMENTS 6,281,924 B1 * 8/2001 Tsuzuki .................... 347/251
2001/0024302 A1 * 9/2001 Fujita ......................... 358/536
2002/0067511 A1 * 6/2002 Fujita ......................... 358/3.06
2004/0061903 A1 * 4/2004 Fujita ......................... 358/3.06
2005/0094212 A1 * 5/2005 Asai et al. ................. 358/3.06
2005/0243344 A1 * 11/2005 Tai et al. .................... 358/1.9
2005/0264834 A1 * 12/2005 Asai et al. ................. 358/1.9

FOREIGN PATENT DOCUMENTS

| JP | 04-189068 | 7/1992 |
| JP | 5-176163 | 7/1993 |
| JP | 05-176163 | 7/1993 |
| JP | 08-069139 | 3/1996 |
| JP | 8-163363 | 6/1996 |
| JP | 11-177821 | 7/1999 |

* cited by examiner

*Primary Examiner*—Scott A. Rogers
(74) *Attorney, Agent, or Firm*—Mattingly, Stanger, Malur & Brundidge, P.C.

(57) ABSTRACT

An electrophotographic apparatus reproduces a picture by expressing a gradation of the picture by use of halftone spots which are each formed by dot pictures within a plurality of pixels. The electrophotographic apparatus has a picture reproducing engine for forming the dot pictures by attaching toner to virtual dot areas each within the pixel, and an image processing unit for causing (i) growth of halftone spots of a first group in a first data range of input image data to increase a gradation of the dot pictures, and (ii) growth of halftone spots or a second group in a second data range of the input image data, which is adjacent to higher gradation level side of the first data range to further increase the gradation of the dot pictures. The gradation of the dot pictures is simply increased by the image processing unit without decrease at a boundary between the first and second data ranges.

12 Claims, 30 Drawing Sheets

FIG.2
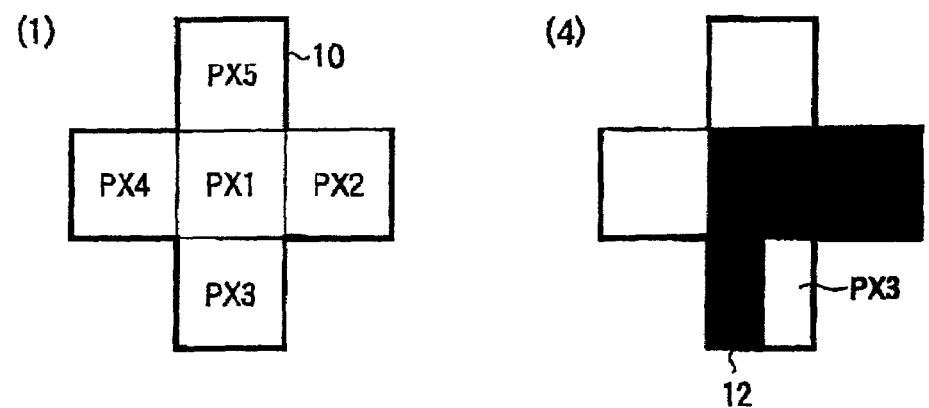
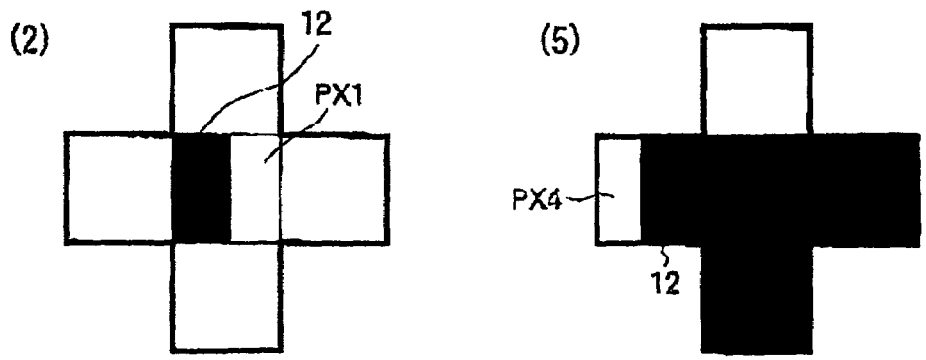
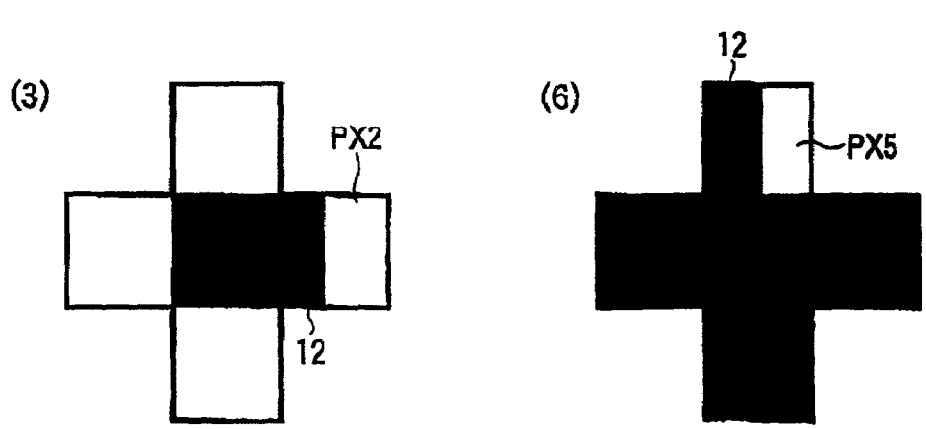

FIG.4
GROWING OF 
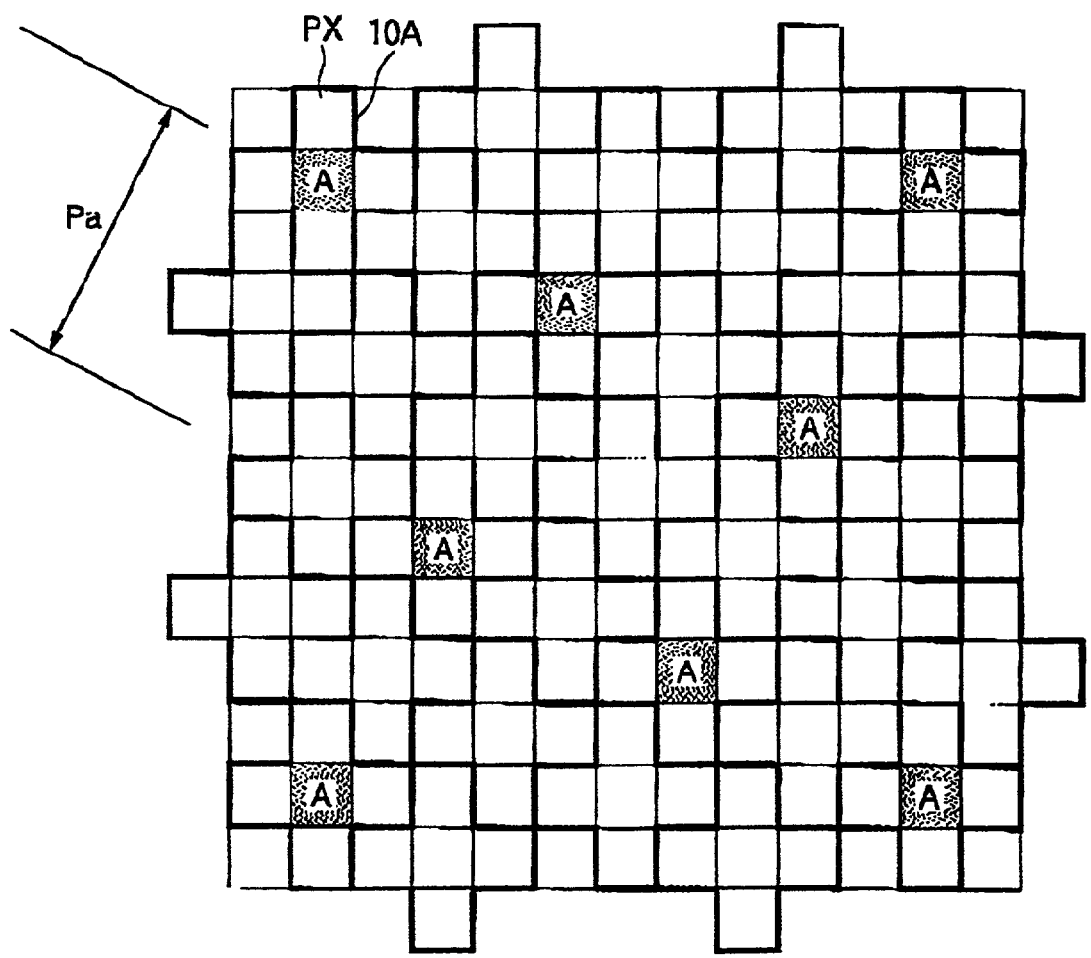

FIG.5
GROWING OF 
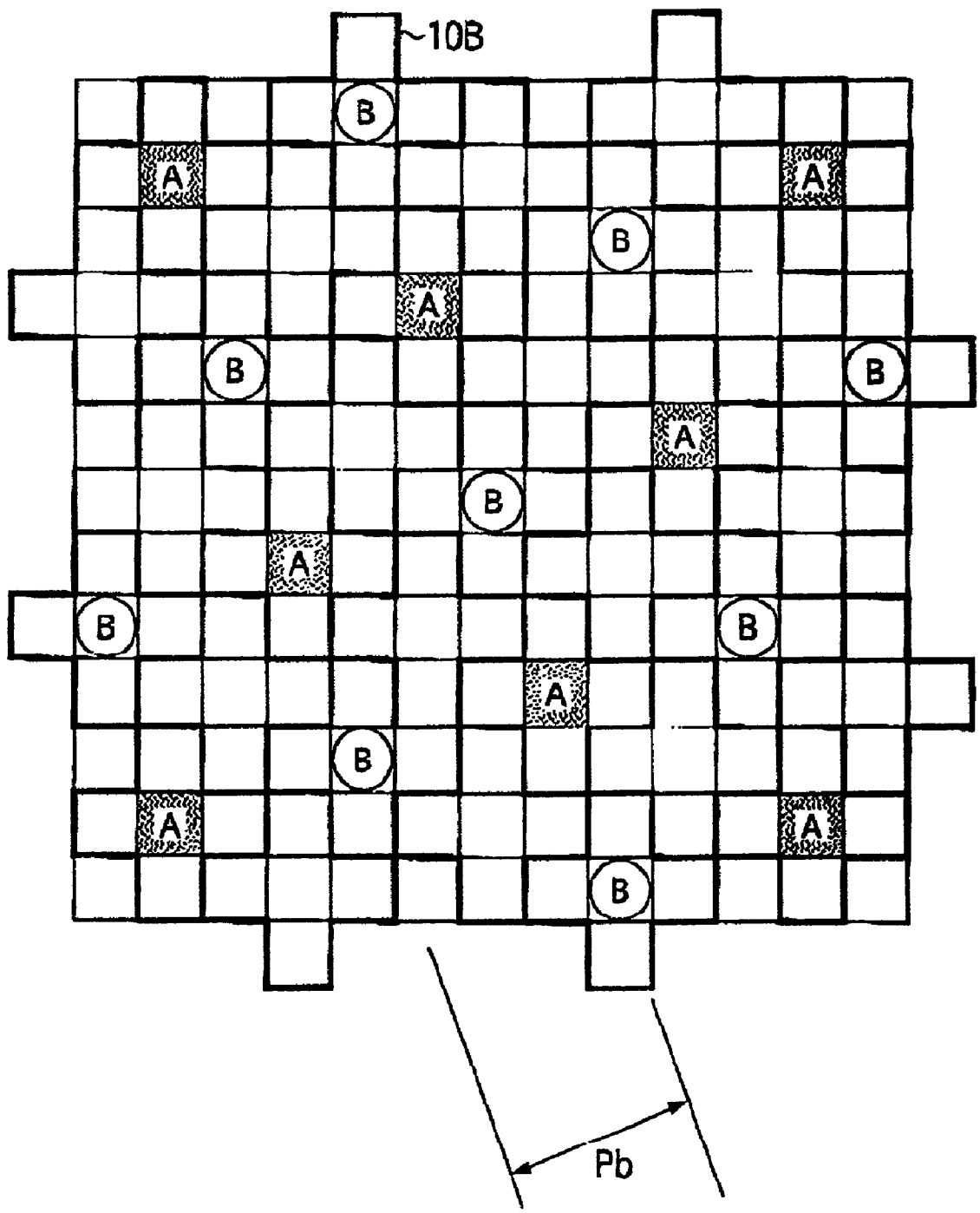

STEP S1 : GROWING OF FIRST PIXEL OF "A"

STEP S2: GROWING OF FIRST PIXEL OF "B"

STEP S3: GROWING OF FIRST PIXEL OF "C"

STEP S4: GROWING OF SECOND PIXEL OF "A", "B", "C"

STEP S5: GROWING OF THIRD PIXEL OF "A", "B", "C"

STEP S6: GROWING OF FOURTH PIXEL OF "A", "B", "C"

STEP S7 : GROWING OF FIFTH PIXEL OF "C"

STEP S8 : GROWING OF FIFTH PIXEL OF "B"

FIG.16
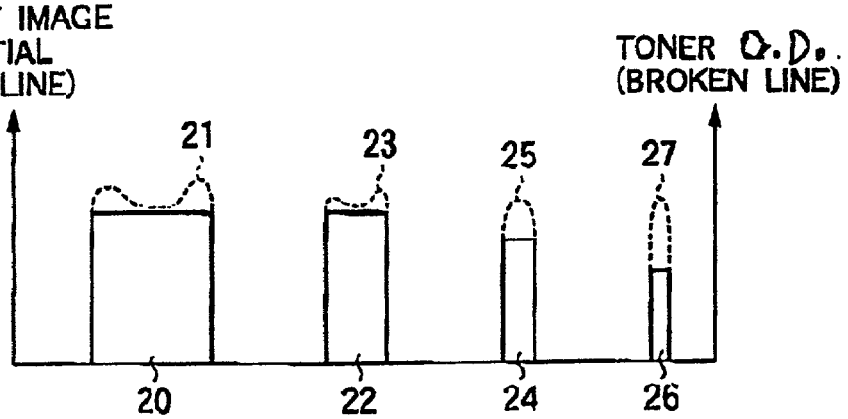
(1) LATENT IMAGE POTENTIAL (SOLID LINE) / TONER O.D. (BROKEN LINE)
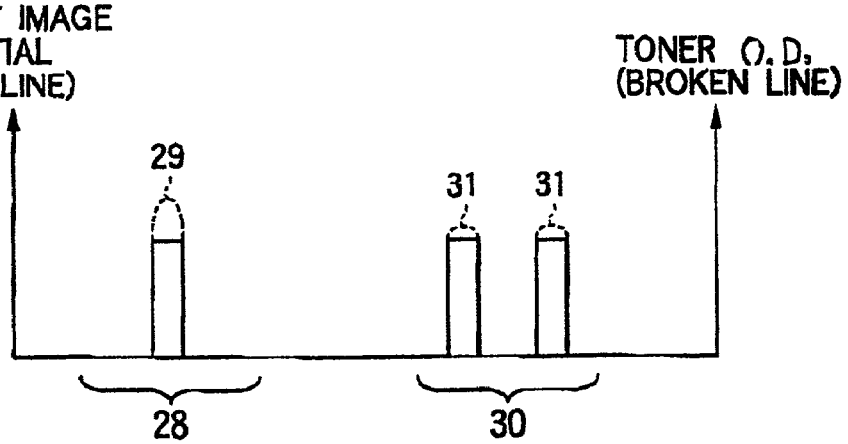
(2) LATENT IMAGE POTENTIAL (SOLID LINE) / TONER O.D. (BROKEN LINE)
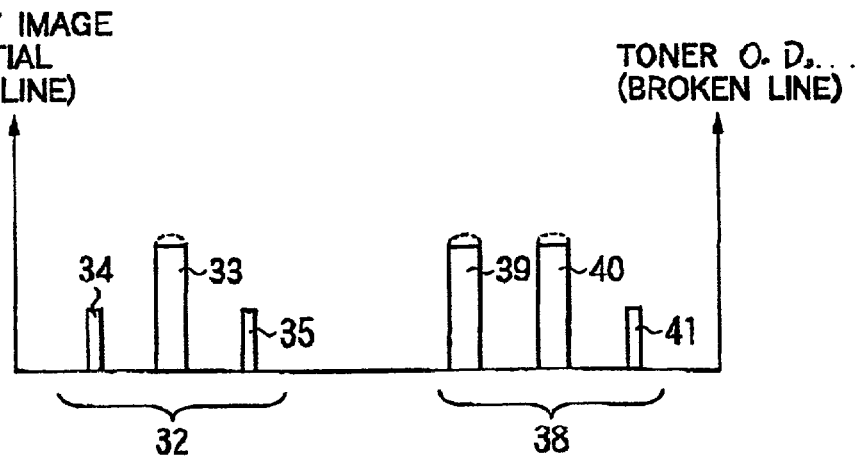
(3) LATENT IMAGE POTENTIAL (SOLID LINE) / TONER O.D. (BROKEN LINE)

FIG.17
S1 : GROWING OF 
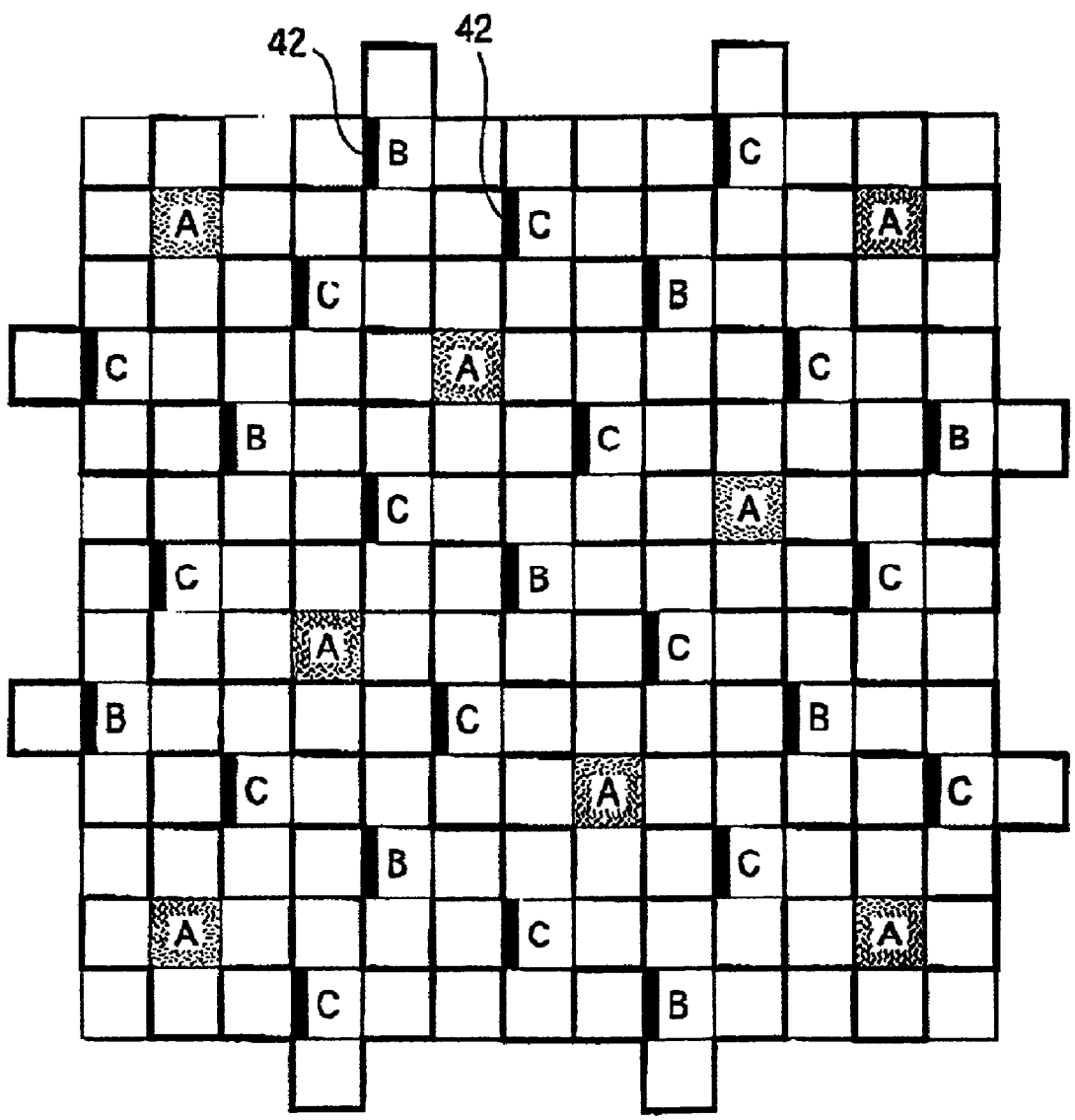

S2: GROWING OF Ⓑ

FIG.20
S1 : GROWING OF 
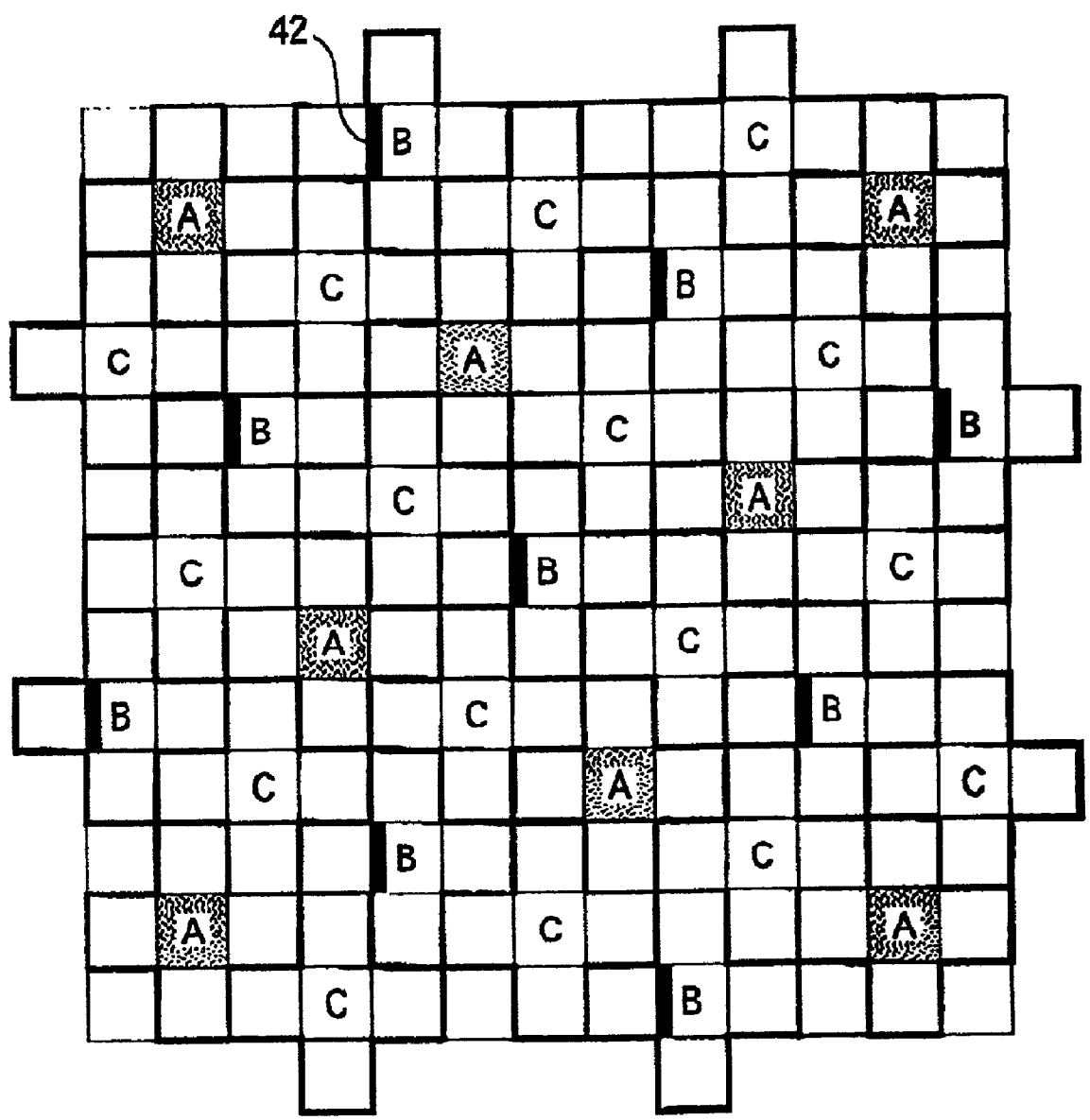

FIG.23
(1) INPUT PICTURE IMAGE DATA
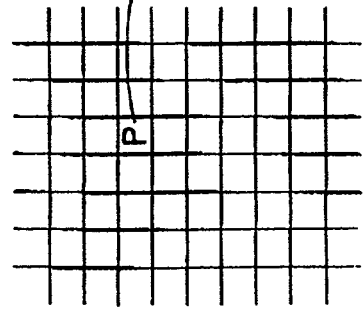
(2) LUT MATRIX
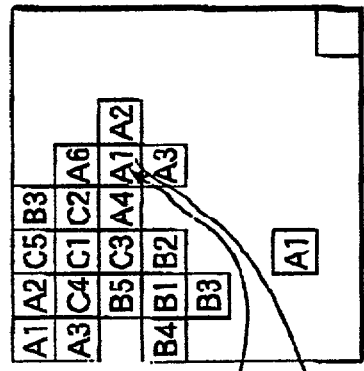
(3) LOOK-UP TABLE GROUP
| INDEX | INPUT | 0 | 1 | 2 | 3 | ........ | i | ........ | j | ........ | k | ........ | 255 |
|---|---|---|---|---|---|---|---|---|---|---|---|---|---|
| A-1 | | 0 | 10 | 20 | 30 | ........ | 255 | | | | | | 255 |
| B-1 | | 0 | 5 | 5 | 5 | ........ | 5 | 10 | 20 | 30 | ........ | 255 | 255 |
| C-1 | | 0 | 5 | 5 | 5 | ........ | 5 | ........ | 5 | 10 | 15 | 20 ........ 255 | 255 |
| A-2, B-2, C-2 | | 0 | 0 | 0 | 0 | ........ | ........ | | | | 0 | 2.5 5 7.5 10 ........ 255 | 255 |
| ... | | | | | | | | | | | | | |
| A-5 | | 0 | 0 | 0 | 0 | ........ | | | | | | | 255 |

FIG. 24
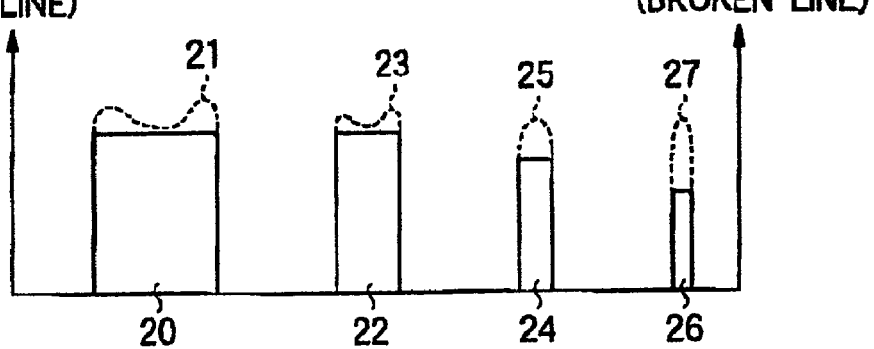
(1) LATENT IMAGE POTENTIAL (SOLID LINE) / TONER O.D. (BROKEN LINE)
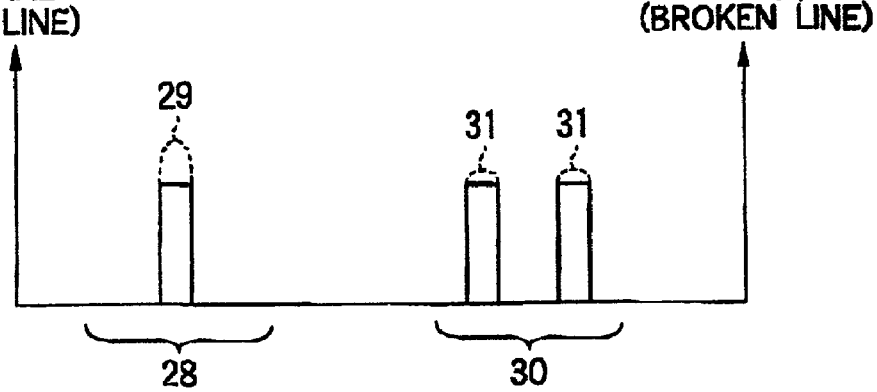
(2) LATENT IMAGE POTENTIAL (SOLID LINE) / TONER O.D. (BROKEN LINE)
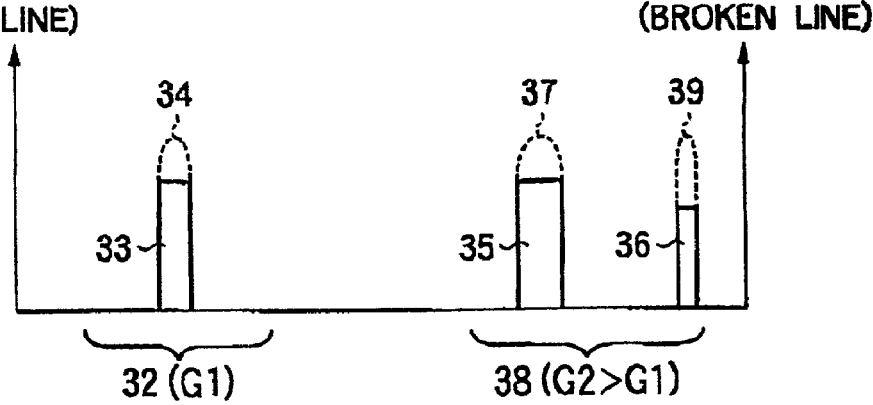
(3) LATENT IMAGE POTENTIAL (SOLID LINE) / TONER O.D. (BROKEN LINE)

FIG.26
FIRST HALF OF "S1A" : GROWING OF 
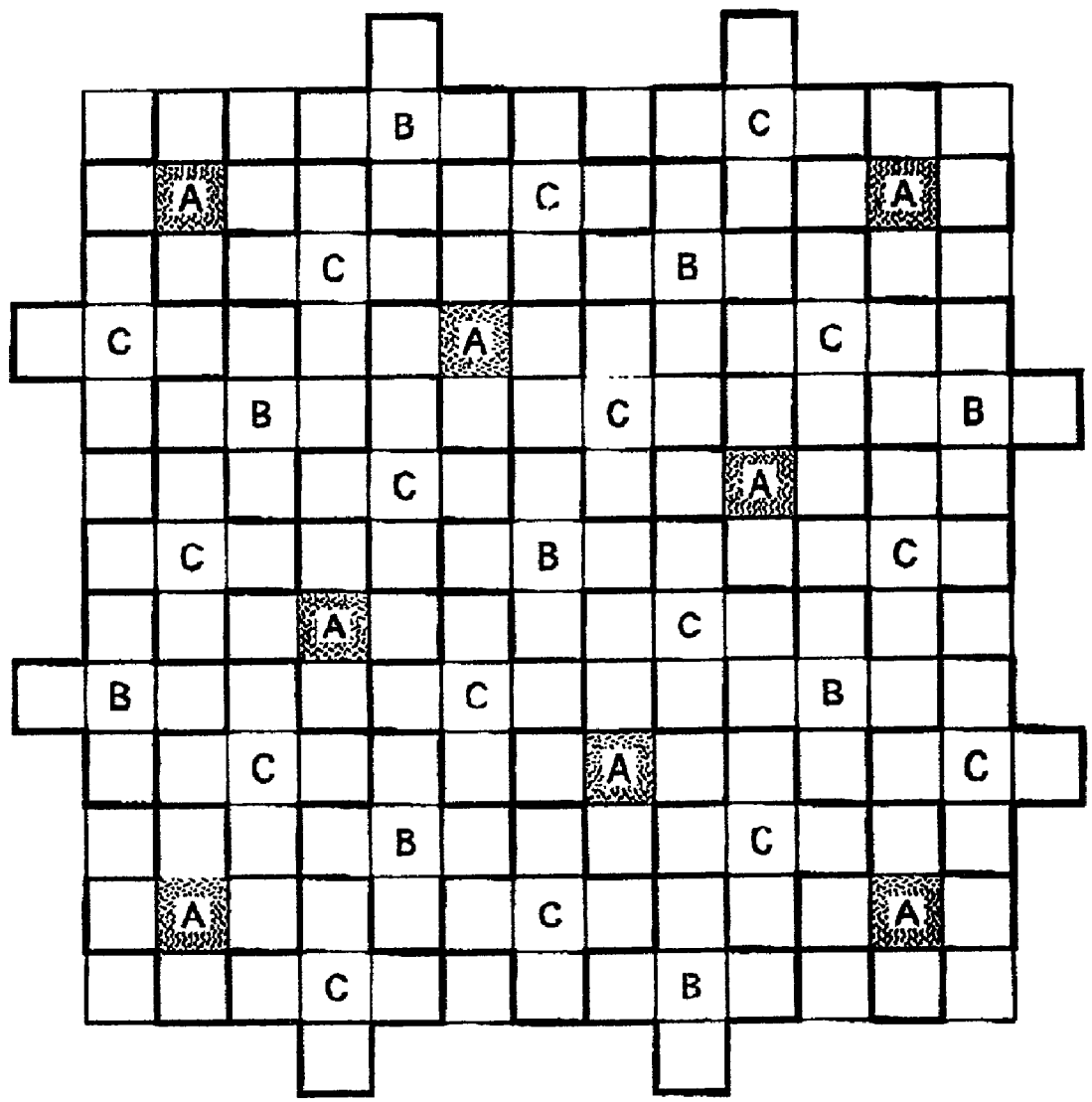

SECOND HALF OF "S1A": SIMULTANEOUS GROWING OF A AND B

SECOND HALF OF "S2A" : SIMULTANEOUS GROWING OF Ⓑ AND [C]

FIG.29
(1) INPUT PICTURE IMAGE DATA
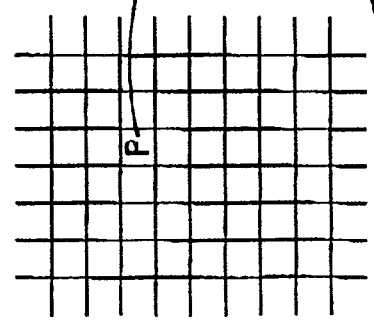
(2) LUT MATRIX
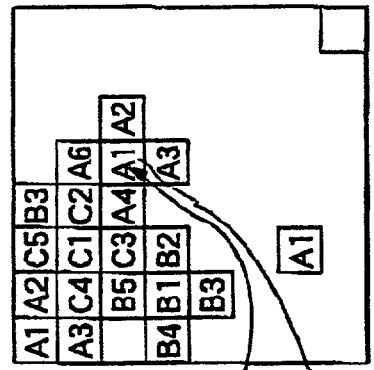
(3) LOOK-UP TABLE GROUP
| INDEX \ INPUT | 0 | 1 | 2 | 3 | ... | i | ... | j | ... | k | ... | 255 |
|---|---|---|---|---|---|---|---|---|---|---|---|---|
| A-1 | 0 | 10 | 20 | 30 | ... | 255 | | | | | | |
| B-1 | 0 | 0 | 0 | 0 | ... | 10 | ... | 70 80 90 100 | ... | 255 | | |
| C-1 | 0 | 0 | 0 | 0 | ... | 0 | ... | 0 0 0 0 | ... | 10 20 | ... | 255 |
| A-2, B-2, C-2 | 0 | 0 | 0 | 0 | ... | | ... | | ... | 255 | | |
| ... | | | | | | | | | | | | |
| A-5 | 0 | 0 | 0 | 0 | ... | | ... | | ... | 0 2.5 5 7.5 10 | ... | 255 |

ELECTROPHOTOGRAPHIC APPARATUS AND IMAGE PROCESSING PROGRAM

The present application is based on Japanese Patent Applications No. 2001-019855 and 2001-026947, which are incorporated herein by reference.

BACKGROUND OF THE INVENTION

1. Field of the Invention

The present invention relates to an electrophotographic apparatus, and an image processing method and an image processing program which are used for the electrophotographic apparatus. More particularly, the invention relates to an electrophotographic apparatus which more smoothes a variation of gradation of a picture of low gradation levels, thereby improving a quality of the picture, and an image processing method and an image processing program which are used for the electrophotographic apparatus.

2, Description of the Related Art

A color electrophotographic apparatus is widely used in various types of image forming apparatus, such as color printers and color copying machine. In the electrophotographic apparatus, a photoreceptor or a photosensitive member is exposed to light containing image information of a picture on an original document, and an electrostatic latent image is formed on the photoreceptor. The electrostatic latent image is developed by color toners of such colors as cyan (C), magenta (M), yellow (Y) died black (K). The color toner images are transferred and fixed to an image supporting member, e.g., a sheet of paper. In this way, the original picture is reproduced by the electrophotographic apparatus. In the laser beam printer, a laser beam is utilized for forming an electrostatic latent image on the photoreceptor. An electrostatic latent image is formed in a manner that a laser beam is irradiated on pixel areas which are arrayed in a fast or main scan direction in which the laser beam is moved for scanning and a slow scan or sub-scan direction in which the image supporting member is fed. Of those laser beam printers, a laser beam printer or the type in which the pulse width of a pulse signal for driving the laser beam is modulated, is capable of varying an irradiation area of the laser beam within the pixel area. Accordingly, even if the number or pixels per unit area is small, the laser bean printer reproduces a color picture of high resolution and good gradation.

In the laser bean printer of the pulse width modulation (PWM) type, a halftone spot half-toning technique, which is based on the multi-level dithering method, is known for one of the techniques to reproduce a gradation of a gradation image. In the multi-level dithering method, for the gradation data formed every color, which is contained in the input signal, a conversion table is referred to a conversion table, called a look-up table (LUT). The LUT contains image reproducing information determine the size and other items of a virtual dot. The size and other items (dot position in same cases) of the virtual dot within each pixel area are determined by referring to the LUT. The size of the virtual dot is expressed in terms of levels representing divisions of a size from 0 to the maximum size value of the virtual dot. By using the levels, an output signal of each pixel is multi-valued.

The term, "virtual or ideal dot", is defined as an area within a pixel area, which is scanned with the laser beam. A size of the virtual dot as viewed in the fast scan direction is the product of multiplying a time period of driving the laser beam by a scanning speed of the laser beam. A size of it as viewed in the slow scan direction is equal to a size of the pixel area as viewed in the slow direction. The virtual dot and a "dot picture" on a final picture are different in shape for the reasons given below. Accordingly, in the specification, those different terms will be used for the distinguishing purpose. Within the virtual dot of each pixel area, the laser beam is driven and an area irradiated with the laser beam is formed on the photoreceptor. This irradiation area takes a shape radially expanded around the virtual dot since the laser beam has a size, and the rise and fall characteristics when it is driven. The irradiation area of the laser beam, serves a latent image area on the photoreceptor. The latent image in this area is developed into a visual image by toner, and the toner image is transferred onto an image supporting member, e.g., paper. As a result, a dot picture is formed in a final picture. Also during the developing process, the dot picture is further deformed from the virtual dot for some reasons. For example, the toner particles are scattered. Thus, the dot picture is deformed from the virtual dot, and its deformation depends on the electrophotography process. Therefore, the final dot picture can be controlled by controlling the virtual dot formed through the driving operation of the laser beam.

FIG. 1 is a diagram for showing a developing process in a general electrophotography process. A virtual dot area 2 on a surface of a photoreceptor or photosensitive drum 1, which is set at negative voltage (−1000V), is irradiated with a laser boom, so that an electrostatic latent image area 3 at UV is formed therein. Toner 5 charged at a negative Voltage (−500V) on a developing drum 4 is supplied to the photoreceptor drum supporting the electrostatic latent image thereon, so that the negatively charged toner particles 5 attach to the electrostatic latent image area 3 of 0V. Thereafter, the toner attaching thereto is transferred to such an image supporting member as a printing paper, so that a dot picture is formed on the image supporting member.

The halftone spot halt-toning technique forms a dot picture within a single pixel or a halftone spot consisting of a cluster of dot pictures, which covers a plurality of adjacent pixels, and reproduces a gradation of a gradation image by using the size of the halftone spot. To be more exact, as a gradation value of the gradation data of each pixel increases, a virtual dot generates, and a core of growth or a growth nucleus of the halftone spot in the final Picture is generated. When the gradation value of the gradation data further increases, the number of virtual dots and the area of them are increased, and the size of the halftone spot gradually grows. Accordingly, in the technique in which the halftone spot grows with increase of the gradation value of the input gradation data, the area of the virtual dot grows earlier in the pixel located at the center of the halftone spot (near the growth nucleus), and it grows later in the pixel closer to the periphery of the halftone spot (located apart from the growth nucleus).

FIG. 2 is a diagram exemplarily showing how a halftone spot grows. A halftone cell or halftone spot area 10 shown in FIG. 2 takes a cross shape consisting of five pixels PX1 to PX5. The center pixel PX1 serves as a growth nucleus which first grows when the gradation level of the gradation data increases. As shown in (2) in FIG. 2, when the gradation level increases, a virtual dot 12 in the center pixel PX1 gradually increases its size. When it is further increased, the size of the virtual dot 12 within the pixel PX2 increases as shown in (3) in FIG. 2. Subsequently, the virtual dot grows in the pixels PX3, PX4 and PX5 in this order, as shown in (4), (5) and (6) in FIG. 2. Finally, the virtual dot grows to fill all the pixels, and the size of the halftone spot is maximized.

Thus, those plural pixels forming one halftone spot have different area growing characteristics, respectively. For this reason, a plurality or look-up tables (LUTs) are used. In the example of FIG. 2, LUTs are assigned to the pixels PX1 to PX5, respectively. A two-dimensional array consisting of those LUTs as array elements is constructed for each halftone spot. Those two-dimensional arrays are replicatively laid over the input picture image data, as paved with tiles, whereby an overall picture is reproduced by using halftone spot 3. In the specification, the two-dimensional array will be referred to as a look-up table matrix (LUT matrix).

In the electrophotographic apparatus, the virtual dot area within the pixel is irradiated with a laser beam to form an electrostatic, latent image, and toner particles are attached to the latent image area to form a dot picture. And a halftone spot of a dot picture consisting of a plurality of pixels is made to grow. To increase a resolution of a final picture of the dot pictures, it is desirable to increase the number of screen lines connecting the halftone spots per inch as large as possible.

In connection with this, there is a proposal that in a data range of low gradation levels, to stabilize the output characteristic of the electrophotography process, a density of growing halftone spots is held to below and hence, to decrease the number of screen lines per inch. Where the number of growing halftone spots is large, the virtual dot area in each growth nucleus is too small. As a result, a print-dot missing occurs, and gradation levels are inappropriately reproduced in a final picture. Where the virtual dot area is extremely small, a critical point to determine whether or not the dot picture is formed varies depending on ambient conditions where the engine in the electrophotographic apparatus is used. Further, the print-dot missing occurs when such a critical point varies. In the data range of rather high gradation levels, all the halftone spots are simultaneously increased in size, whereby the number of screen lines is increased and hence, a sharp final picture is reproduced at high resolution.

Where such a halftone spot growing technique that in the data range of low gradation levels, the halftone spots are made to grow so as to reduce the number of screen lines, and with increase of the gradation level, the number of screen lines is increased, viz., the number of growth nucleuses of the halftone spots is increased, is employed, the gradation in the final picture, which is formed by dot pictures as finally developed, improperly increased. This fact was found by the inventor of the present patent application. More exactly, the inventor found the following fact: with increase of gradation of input picture image data, a gradation of a final picture produced after the developing process stepwise increases, and in an extreme case, the gradation of the final picture is inverted From our further study, it was found that at a transient part where the number of screen lines is changed to another number of screen lines with increase of the gradation level of the input picture image data, the gradation of the final picture unnaturally varies or is inverted.

SUMMARY OF THE INVENTION

Accordingly, an object of the present invention is to provide an electrophotographic apparatus in which a gradation in a final picture produced after the developing process normally varies with a gradation variation of input picture image data, and an image processing program for use in the electrophotographic apparatus.

Another object of the present invention is to provide an electrophotographic apparatus which forms a final picture having a stable gradation in a picture area of low gradation levels, and a final picture which is high in resolution and sharpness in a picture area of high gradation levels, and an image processing program for use in the electrophotographic apparatus.

To achieve the above object, according to one aspect of the present invention, there is provided a first electrophotographic apparatus for reproducing a picture by expressing a gradation of the picture by use of halftone spots which are each formed by dot pictures within a plurality of pixels, the electrophotographic apparatus comprising: a picture reproducing engine for forming the dot pictures by attaching toner to virtual dot areas each within the pixel based on picture reproducing data; and an image processing unit which generates the picture reproducing data which causes, in a first data range of a low gradation level in input picture image data, the growth of halftone spots of a first group for generating a first number of screen lines, in accordance with increase of the gradation level, and causes, in a second data range of which the gradation level is higher than that of the first data range, the growth of halftone spots of a second group for generating a second number of screen l which is larger than the first number of screen lines, in accordance with increase of the gradation level wherein the image processing unit further generates the picture reproducing data which simply increases a gradation of each the dot picture at a boundary between the first and second data ranges.

In the electrophotographic apparatus, picture reproducing data is generated such that to increase the picture resolution in a manner that the number of screen lines is reduced in the data range of low gradation level, and the number of screen lines is gradually increased with increase of gradation, the gradation levels of the dot pictures are gradually increased even at a transient part where the number of screen lines is changed to another number or screen lines.

According to another aspect of the invention, there is provided a second electrophotographic apparatus for reproducing a picture by expressing a gradation of the picture by use of halftone spots which are each formed by dot pictures within a plurality of pixels, the electrophotographic apparatus comprising: a picture reproducing engine for forming dot pictures by attaching toner to virtual dot areas each within the pixel based on picture reproducing data; and an image processing unit for converting a gradation of input picture image data into the picture reproducing data of the virtual dot area; wherein the image processing unit generates picture reproducing data which causes, in a first data range of a low gradation level in the; input picture image data, the growth of a first group of halftone spots in accordance with increase of the gradation level, and causes the growth of a second group of halftone spots in a second data range of which the gradation level is higher than that of the first data range, and the image processing unit generates picture reproducing data for simultaneously in the first data range generating fine virtual dot areas small enough to fail to form dot pictures or toner in a halftone spot area other than the halftone spots of the first group.

The fine virtual dot areas small enough to fail to become dot pictures or toner have following functions. In an electrophotographic apparatus, the edge effect is present between a latent image area formed on a photoreceptor drum and a density of toner attaching thereto. The edge effect is a phenomenon that when a photoreceptor drum on which a latent image is formed and a developing roller for supplying charged toner are in a non-contact state, toner is excessively attached to the periphery part of a latent image area 3 (see FIG. 3). It is estimated that the edge effect is due to the supplying of excessive charged toner. Where the edge effect is present, even if the latent image area 3 has a minute size and its potential is insufficiently high, an excessive amount of toner is supplied to the latent image area and sometimes attaches to the latent image area.

The edge effect remarkably appears when a density of virtual dots is low. When the virtual dot density is high, the excessive toner supplying is lessened, and the edge effect is also weakened.

Accordingly, in the growing process in which the halftone spots of a first halftone spot group are made to grow with increase of the gradation level in a first data range of low gradation levels in the input picture image data, and the halftone spots of a second halftone spot group which are different from the halftone spots of the first halftone spot group are made to grow in a second data range of which the gradation is higher than that in the first data range, the virtual dot density is low and the edge effect is strong in the first data range, and a sufficient amount of toner attaches to the latent image area corresponding to the virtual dot area. In the second data range, the virtual dot density is high, and the edge effect is weak, and hence, an insufficient amount of toner attaches to the latent image area. As a result, at the boundary between the first and second data ranges, the gradation of the final picture or the dot pictures stepwise varies with a gradation variation of the input picture image data. In an extreme case, the gradation of the final picture is inverted.

To cope with, in the first data range, a fine virtual dot area or areas, which are small enough to fail to become dot pictures of toner, are simultaneously generated in a halftone spot area other than the growing halftone spots of the first halftone spot group. As a result, in the first data range of low gradation levels in the input picture image data, a virtual dot density is higher than that of the growing halftone spots of the first halftone spot group. Accordingly, the edge effect is lessened in this area. At a boundary point between the first and second data ranges, a variation of the virtual dot density is lessened, and the edge effect is also lessened. There is eliminated the problem of the unnatural variation of the gradation in the final picture. Thus, in the invention, the gradation of the final picture more smoothly varies with variation of the gradation of the input picture image data.

In a preferred embodiment of the second electrophotographic apparatus, the halftone spot areas other than the halftone spots of the first halftone spot group is a halftone spot area of the second halftone spot group. With such a unique feature, in the first data range of the gradation level, the virtual dot area increases with increase of the gradation in the halftone spots of the first halftone spot group, and a fine virtual dot is generated in the halftone spot of the second halftone spot group. Accordingly, at the boundary between the first and second data ranges, the density of the virtual dot areas little varies, and the edge effect little varies before and after the boundary. As a result, the gradation variation of the final picture is smooth.

In another preferred embodiment, the image processing unit generates picture reproducing data which causes the growth of a third group of halftone spots, which are different from those of the first and second groups, in a third data range of which the gradation level is higher than in the second data range, halftone spot areas other than the halftone spots of the first group in the first data range is halftone spot areas of second and third groups, and the image processing unit generates picture reproducing data for simultaneously in the second data range generating the fine virtual dot area in the halftone spot area of the third group.

In the embodiment, the virtual dot area increases with increase of the gradation level in the halftone spots of the first halftone spot group. In the halftone spots of the second and third halftone spot groups, fine virtual dots are generated. Further, a grown virtual dot area is generated in the halftone spot of the second data range; a virtual dot area is generated in the halftone spot to be made to grow of the second halftone spot group; and a fine virtual dot is generated in the halftone spot of the third halftone spot group. Therefore, the virtual dot densities in the first to third halftone spot groups are kept at an equal value.

In yet another preferred embodiment, the image processing unit generates picture reproducing data which causes the growth of a third group of halftone spots, which are different from those of the second and third groups, in a third data range of which the gradation level is higher than in the second data range, a halftone spot area other than the halftone spots of the first group in the first data range is a halftone spot area of a second or third group, and the image processing unit generates picture reproducing data for simultaneously generating the fine virtual dot area in the halftone spot area of the third group in the second data range.

In the embodiment, in the first data range, the virtual dot area grows in the halftone spot of the first halftone spot group, and a fine virtual dot is generated in the halftone spot of the second or third halftone spot group. Further, in the second data range, a grown virtual dot area is generated in the halftone spot of the first data range; a virtual dot area to be made to grow is generated in the halftone spot of the second halftone spot group; and a fine virtual dot is generated in the halftone spot of the third halftone spot group. Therefore, the variation of the edge effect is lessened between the first and second data ranges.

According to a third aspect of the invention, a third electrophotographic apparatus for reproducing a picture by expressing a gradation of the picture by use of halftone spots which are each formed by dot pictures within a plurality of pixels, the electrophotographic apparatus comprising: a picture reproducing engine for forming dot pictures by attaching toner to virtual dot areas each within the pixel based on picture reproducing data; and an image processing unit for converting a gradation of input picture image data into the picture reproducing data of the virtual dot area; wherein the image processing unit generates picture reproducing data which causes, in a first data range of a low gradation level in the input picture image data, the growth of halftone spots at a first density in accordance with increase of the gradation level, and causes the growth of halftone spots at a second density, which is higher than the first density in a second data range of which the gradation level is higher than that of the first data range, and the image processing unit generates picture reproducing data for simultaneously generating fine virtual dot areas small enough to fail to form dot pictures of toner in a halftone spot area other than the growing halftone spots in the first data range.

In the third aspect of the invention, a density of the sum of the growing virtual dot area and the fine virtual dot area in the first data range of low gradation level is at least higher than the first density (or equal to the second density). Therefore, the density difference between the virtual dot area in the first data range and the virtual dot area in the second data range is small (or those are substantially equal), and a variation of the edge effect between the both data ranges is lessened.

According to a fourth aspect of the invention, there is provided a fourth electrophotographic apparatus for reproducing a picture by expressing a gradation of the picture by use of halftone spots which are each formed by dot pictures within a plurality of pixels, the electrophotographic apparatus comprising: a picture reproducing engine for forming dot pictures by attaching toner to virtual dot areas each within the pixel based on picture reproducing data; and an image processing unit for converting a gradation of input picture image data into the picture reproducing data of the virtual dot area; wherein the image processing unit generates picture reproducing data which causes, in a first data range of a low gradation level in the input picture image data, the growth of a first group of halftone spots in accordance with increase of the gradation level, and causes the growth of a second group of halftone spots in a second data range of which the gradation level is higher than that of the first data range, and the image processing unit generates the picture reproducing data which starts, in the first data range, the growing of the halftone spots of the second group in accordance with increase of the gradation level during the growing of the halftone spots of the first group, and stops the growing or the halftone spots of the first group during the growing of the halftone spots of the second group.

In the fourth electrophotographic apparatus, the picture reproducing data is generated which starts, in the first data range, the growing of the halftone spots of the second halftone spot group with increase of the gradation level during the growing of the halftone spots of the first halftone spot group, and stops the growing of the halftone spots of the first halftone spot group during the growing of the halftone spots of the second halftone spot group. Since the growing of the halftone spot of the second halftone spot group starts during the growing of the halftone spot of the first halftone spot group, the edge effect is lessened in a transient part where the growing of the halftone spot of the virtual dot area 2 additionally starts. The gradation of the final picture can be reproduced properly.

In a preferred embodiment of the fourth electrophotographic apparatus, the image processing unit generates the picture reproducing data which gradually increases the number of screen lines each connecting generated halftone spots in a transient data range from the first data range to the second data range. Since the number of screen lines is gradually increased in the data range of low gradation levels, the gradation is properly reproduced in this area. In the data range of high gradation levels, the number of screen lines is increased to increase the resolution. Even if the halftone spot growing process is employed, the edge effect is suppressed, and the gradation of the final picture is properly reproduced in this embodiment.

Finally, the present invention provides the following.

There is provided an electrophotographic apparatus for reproducing a picture by expressing a gradation of the picture by use of halftone spots which are each formed by dot pictures within a plurality of pixels, the electrophotographic apparatus comprising: a picture reproducing engine for forming the dot pictures by attaching toner to virtual dot areas each within the pixel; and an image processing unit for causing (i) growth of halftone spot of a first group in a first data range of input image data to increase a gradation of the dot pictures, and (ii) growth of halftone spots of a second group in a second data range of the input image data, which is adjacent to higher gradation level side of the first data range to further increase the gradation of the dot pictures; wherein the gradation of the dot pictures is simply increased by the image processing unit without decrease at a boundary between the first and second data ranges.

There is also provided an image processing method for reproducing a picture by expressing a gradation of the picture by use of halftone spots which are each formed by dot pictures within a plurality of pixels, the image processing method comprising steps of; growing halftone spots of a first group in a first data range of input image data to increase a gradation of the dot pictures; growing halftone spots of a second group in a second data range of the input image data, which is adjacent to higher gradation level side of the first data range to further increase the gradation of the dot pictures; and simply increasing the gradation of the dot pictures without decrease at a boundary between the first and second data ranges.

Further, there is also provided an image processing program which causes a computer to execute an image processing for reproducing a picture by expressing a gradation of the picture by use of halftone spots which are each formed by dot pictures within a plurality of pixels, the image processing comprising: a step of growing halftone spots of a first group in a first data range or input image data to increase a gradation of the dot pictures; a step of growing halftone spots of a second group in a second data range of the input image data, which is adjacent to higher gradation level side of the first data range to further increase the gradation of the dot pictures; and a step of simply increase the gradation of the dot pictures without decrease at a boundary between the first and second data ranges.

Still further, there is provided an electrophotographic apparatus for reproducing a picture by expressing a gradation of the picture by use of halftone spots which are each formed by dot pictures within a plurality of pixels, the electrophotographic apparatus comprising: a picture reproducing engine for forming the dot pictures by attaching toner to virtual dot areas each within the pixel; and an image processing unit for causing (i) growth of halftone spots of a first group in a first data range of input image data to increase a gradation of the dot pictures, and (ii) growth of halftone spots of a second group in a second data range of the input image data, which is adjacent to higher gradation level side of the first data range to further increase the gradation of the dot pictures; wherein the image processing unit generates virtual dots small enough to fail to form dot pictures of toner in halftone spot areas other than the halftone spots of the first group in the first data range of the input image data.

Still further, there is provided an electrophotographic apparatus for reproducing a picture by expressing a gradation of the picture by use of halftone spots which are each formed by dot pictures within a plurality of pixels, the electrophotographic apparatus comprising: a picture reproducing engine for forming the dot pictures by attaching toner to virtual dot areas each within the pixel; and an image processing unit for causing (i) growth of halftone spots of a first group in a first data range of input image data to increase a gradation of the dot pictures, and (ii) growth of halftone spots of a second group in a second data range of the input image data, which is adjacent to higher gradation level side of the first data range to further increase the gradation of the dot pictures; wherein halftone spots of the second group start to grow during the growth of halftone sports of the first group in the first data range of the input image data.

BRIEF DESCRIPTION OF THE DRAWINGS

In the accompanying drawings:

FIG. 2 is a diagram showing an example of a growth of a halftone spot;

FIG. 4 is a diagram for explaining a process of growing halftone spots grow in a data range of low gradation levels;

FIG. 5 is a diagram for explaining a process of growing halftone spots grow in a data range of low gradation levels;

FIG. 16 is a diagram for explaining the edge effect;

FIG. 17 is a diagram for explaining a first halftone spot growing process in the embodiment of the invention;

FIG. 20 is a diagram for explaining a second halftone spot growing process in the embodiment of the invention;

FIG. 23 is a diagram for showing an example of the look-up

FIG. 24 is a diagram for explaining the edge effect in a fourth halftone spot growing process;

FIG. 26 is a diagram for explaining the growing of halftone spots by the fourth halftone spot growing process;

FIG. 29 is a diagram for explaining a look-up table used in the fourth halftone spot growing process.

DETAILED DESCRIPTION OF THE PREFERRED EMBODIMENTS

The preferred embodiments of the present invention will be described with reference to the accompanying drawings. In the description of the embodiments to be given hereunder, it should be understood that the present invention is not limited to the embodiments, but it involves the invention defined in the appended claims and the equivalents of the defined invention.

Figure 3:
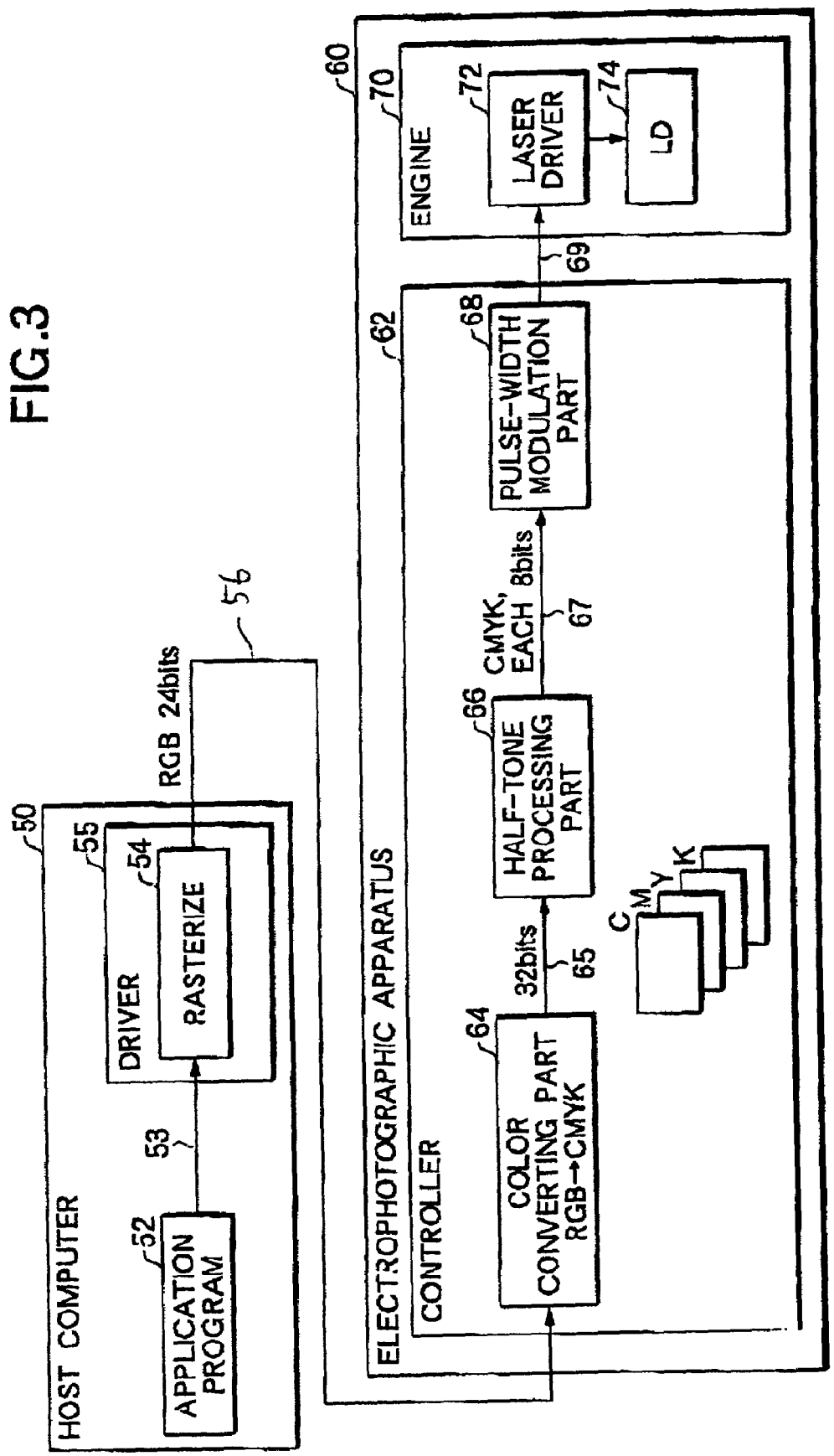
FIG. 3 is a block diagram showing an overall system configuration or an electrophotographic apparatus, which is an embodiment of the present invention.

FIG. 3 is a block diagram showing an overall system configuration of an electrophotographic apparatus, which is an embodiment of the invention In the embodiment, picture image data 56 containing respective color gradation data of R, G and B (each data consisting of 8 bits, and totally 24 bits) is produced by a host computer 50, and transferred to an electrophotographic apparatus 60, such as a page printer The electrophotographic apparatus 60, such as a page printer, reproduces a color picture by using input picture image data 56 as received. The electrophotographic apparatus 60 includes a controller 62 which performs image processing operations and transfers laser drive data 69 to an engine, and the engine, designated by reference numeral 70, for reproducing the image in accordance with the drive data.

In the host computer 50, various data 53, such as character data, graphic data and bit map data, are generated by an application program 52, e.g., word processor or a graphic tool software. The data 53 which are produced by the application program 52 is rasterized by use of a rasterizing function of a driver 55. The driver is used for driving the electrophotographic apparatus and is installed to the host computer 50. Through the rasterizing, the data 53 is converted to the Input picture image data 56 containing RGB color gradation data formed every pixel or dot.

The electrophotographic apparatus 60 also contains a micro processor unit (not shown), and the controller 62 (image processing unit) contained therein includes a color converting part 64, a half-tone processing part 66, a pulse-width modulation part 68, and the like. In the engine 70 contained in the apparatus, a laser driver 72 drives a laser diode 74 for depicting an image in accordance with drive data 69. The engine 70 further includes a photoreceptor or photosensitive drum, a transfer belt and the like, and a drive section for driving them. In FIG. 3, those components are not illustrated, however.

In the controller 62, the color converting part 64 converts RGB gradation data 56 as the input picture image data which are each formed for each pixel, into gradation data 65 of C, M, Y, K colors as toner colors. The gradation data 65 of C, M, Y and K are each gradation data of 8 bits which is representative of gradation levels of each pixel, with the maximum gradation level being 255. The gradation data is formed for each of the color planes of the colors C, M, Y, K, for example. The half tone processing part 66 is supplied with gradation data 65 representative of gradation levels of pixels, for each color plane.

The half tone processing part 66 generates picture reproducing data 67 of the pixels for the received gradation data 65 of each pixel by referring to conversion tables, formed in advance, which contains the correspondences between input gradation data and picture reproducing data. The half tone processing part 66 generates the picture reproducing data 67 for specifying dimensions of the virtual dot areas which express the intermediate gradations, by utilizing the multi-level dithering method.

The pulse width modulation part 68 converts the picture reproducing data 67 into laser drive pulse data 69, which corresponds to the virtual dot area specified by the picture reproducing data 67, and transfers the converted one to the engine 70 in real time. The engine 70 drives a laser beam in accordance with the drive pulse data 69 to irradiate the virtual dot area as specified and to form a latent image on the photoreceptor drum. Toner particles are attached to the latent image area, and are transferred to a supporting member such as a recording paper, thereby forming a final picture.

Accordingly, the growth of a halftone spot, which is formed in accordance with a gradation level of gradation date 65 resulting from the color conversion of the input picture image data 56, will be understood when carefully observing the virtual dot areas specified by the picture reproducing data, which is generated by the half-tone processing part 66 in the controller 62.

Figure 6:
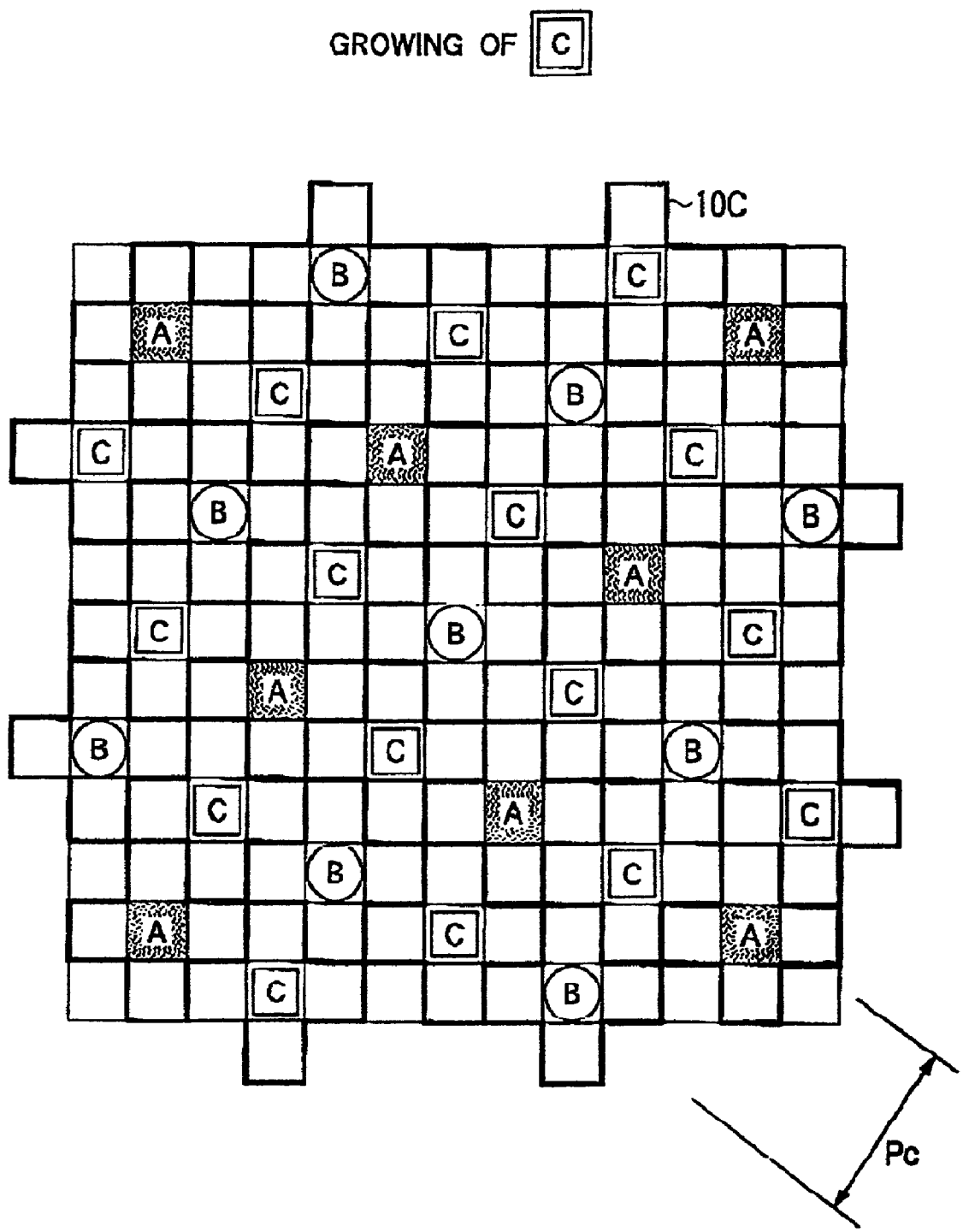
FIG. 6 is a diagram for explaining a process of growing halftone spots grow in a data range of low gradation levels.

FIGS. 4 to 6 are diagrams for explaining a process in which halftone spots grow in a data range of low gradation levels. In FIGS. 4 to 6, there are illustrated a plurality of pixels PX and a plurality of halftone cells or halftone spot areas 10A, 10B, 10C. Each halftone spot area consists of a central growth nucleus pixel and four pixels disposed around the growth nucleus pixel, which are arrayed is a cross shape, as in the halftone spot area 10 shown in FIG. 2. The screen contains three groups of halftone spots. The three halftone spot groups are a first halftone spot group denoted as "A" in FIG. 4, a second halftone spot group "B" in FIG. 5 and a third halftone spot group "C" in FIG. 6. In this example, the halftone spots A of the first group are arrayed at a first density; the halftone spots B of the second group are arrayed at the first density; and the halftone spots C of the halftone spot group are arrayed at a second density, which is two times as high as the first density.

In the growth of the halftone spot in the image area of low gradation levels (lighter area), the halftone spot grows with the center pixel as the growth nucleus, as described referring to FIG. 2. For this reason, input picture image data is generated such that in the first data range of the input image data of which the gradation level is low, only the growth nucleus virtual dot of the halftone spot A of the first halftone spot group, not the growth nucleus pixels of all the halftone spots, grows with increase of the gradation level. Specifically, in the central growth nucleus pixel areas of halftone spot area 10A of the first halftone spot group in FIG. 4, the virtual dot areas grow with increase of the gradation level.

Accordingly, in the first data range of low gradation levels, the halftone spots which grow with increase of the gradation level are limited to those halftone spots A of the first halftone spot group. And, a pitch Pa between adjacent screen lines, each connecting halftone spots of the dot pictures, is wide as shown. In other words, the number of screen lines per inch is small.

Thus, the halftone spots are made to grow within the limited area or the area of the first halftone spot group, which is fewer than the whole halftone spot areas. Accordingly, the area of the virtual dot within the growth nucleus pixel nay be increased even in the first data range of low gradation levels. Accordingly, the instable electrophotography process characteristic of the engine in the electrophotographic apparatus, viz., the image element area changing from the virtual dot area to latent image area, then to toner particles attached area, and finally to dot picture forming area, can be stabilized. In other words, the instability of the output characteristic of the engine, which is inevitable where the virtual dot area is small, is suppressed. There is eliminated the print-dot missing. Further, a variation of the gradation in a final picture nay be more properly reproduced in a picture area of such gradation levels as to be sensitive to human eyes.

In the first data range of the lowest gradation level, the virtual dots grow to have a maximum size in the growth nucleus pixel areas of the halftone spots A of the first halftone spot group. In the second data range of which the gradation level is higher than that in the first data range, the virtual dot area grows with increase of the gradation level in each halftone spot area B of the second halftone spot group in a state that the growth nucleus pixel of the halftone spot A of the first halftone spot group has grown, as shown in FIG. 5. Thus, the halftone spots B of the second group are additionally formed by the growing process, upon formation of the halftone spots A of the first halftone spot group. Accordingly, in the second data range, the virtual dots are formed in the halftone spot areas of the first and second groups. As a result, a pitch Pb between adjacent screen lines, each connecting halftone spots A and B of the first and second halftone spot groups, is narrower than the pitch Pa, as shown in FIG. 5. In other words, the number of screen lines per inch is larger than that in the first data range.

Further, in the second data range, the virtual dot grows to have a maximum size within the growth nucleus pixel of each halftone spot B of the second halftone spot group. Subsequently, in the third data range of which the gradation level is higher than that in the second data range, the virtual dot area grows with increase of the gradation level in each halftone spot area C of the third halftone spot group in a state that the growth nucleus pixels of the halftone spot A and B of the first and second halftone spot groups have grown as shown in FIG. 6. Accordingly, the half-tone processing part generates such picture reproducing data for the third data range such that all the halftone spot areas contain the virtual dots. As a result, a pitch Pc between adjacent screen lines is narrower than the pitch Pb, as shown in FIG. 6. In other words, the largest number of screen lines per inch is produced.

In a data range of which the gradation level is higher than in the data ranges mentioned above, the picture reproducing data is generated such that the virtual dot areas grow with increase of the gradation level at all the halftone spots A, B, C. The growing of the virtual dot is as described referring to FIG. 2.

FIGS. 7 through 14 show diagrams useful in explaining how a halftone spot grows with increase of the gradation level. The growing process of the halftone spot in the embodiment of the invention consists of steps S1 to S9, which correspond to a gradation variation range from 0 to a maximum gradation level. FIG. 15 is a diagram showing a look-up table in a conversion table in the half-tone processing part of the electrophotographic apparatus.

Figure 7:
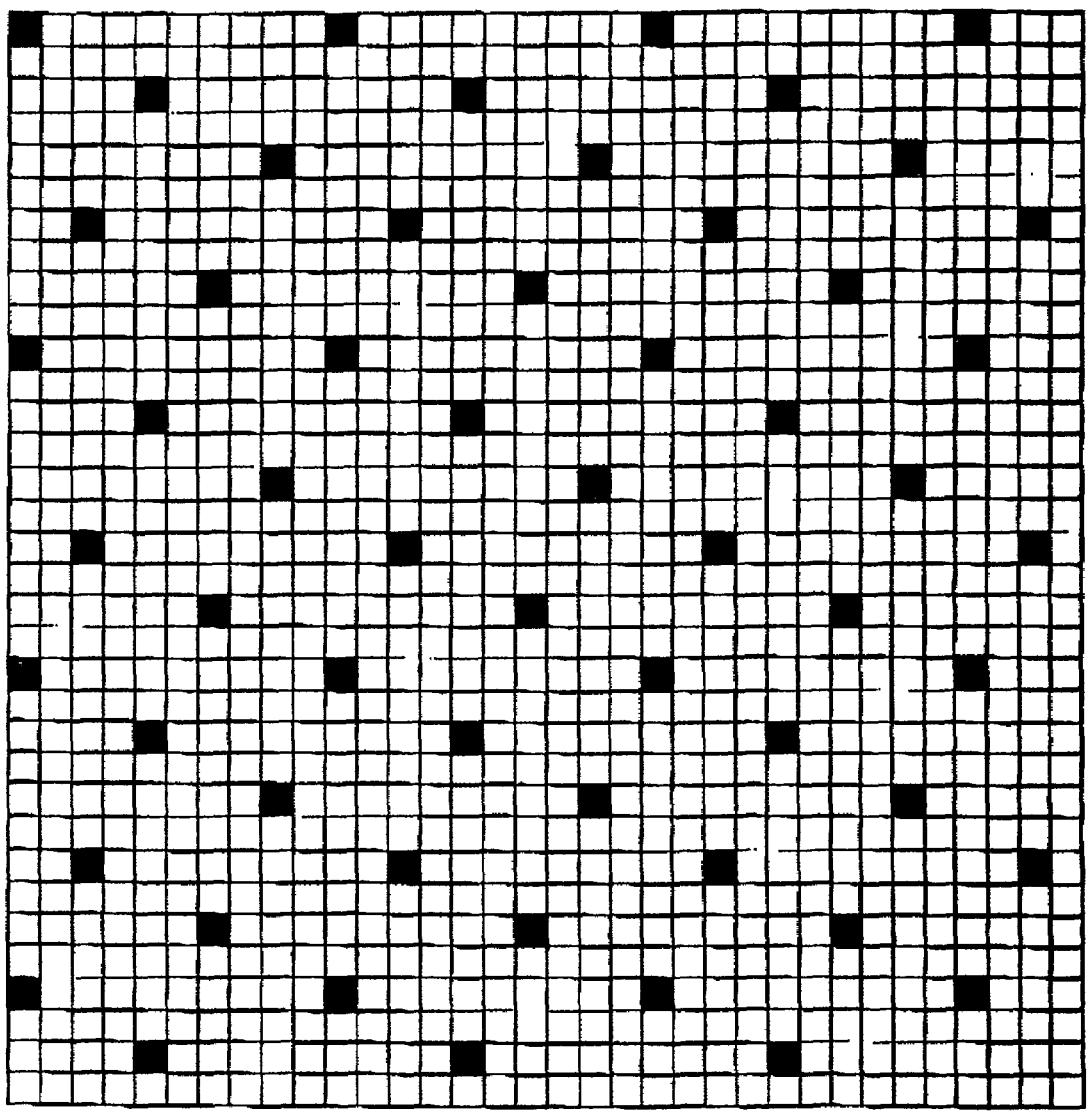
FIG. 7 is a diagram for explaining a growing process of halftone spots, which is carried out with increase of the gradation level.

In a step S1 of FIG. 7, there is shown a growing process of a halftone spot in a gradation area of the lowest gradation level, and a virtual dot area grows within a first pixel area as a growth nucleus in the halftone spot area A of the first halftone spot group. The growing process of the virtual dot is the same as in FIG. 4. As shown in the step S1 in FIG. 15, in the look-up table (LUT), for input picture image data 65 containing gradation data of gradation levels, output data increases which is indicative of a size of a virtual dot in a first pixel area A-1 as a growth nucleus pixel in the halftone spot area A Accordingly, FIG. 7 shows a state that the halftone spot area is maximized within the first pixel area of the halftone spot area A.

Figure 8:
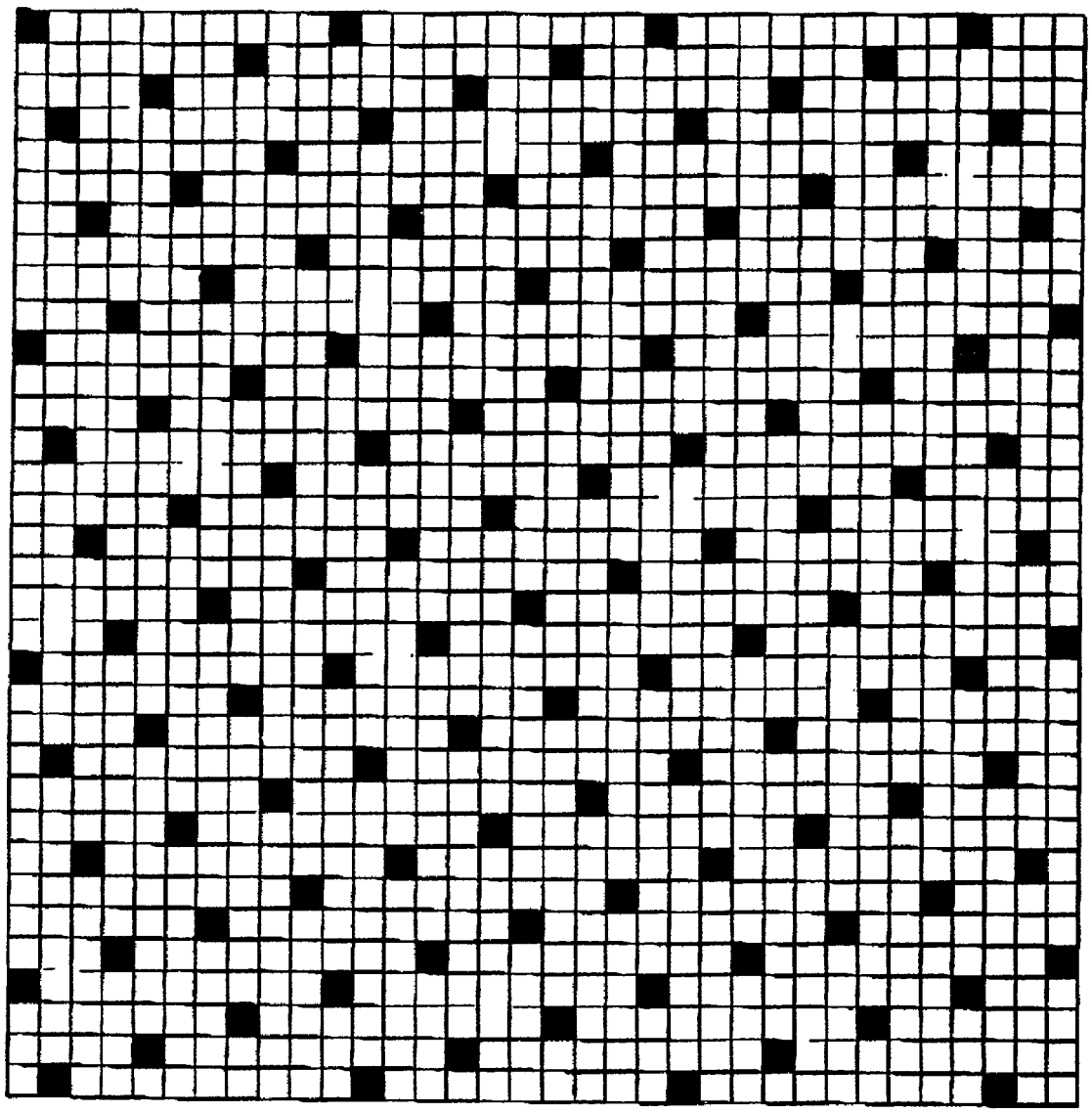
FIG. 8 is a diagram for explaining a growing process of halftone spots, which is carried out with increase of the gradation level.

In a step S2 of FIG. 8, there its shown a growing process of a halftone spot in a gradation area whose gradation level is higher than the above-mentioned one, and a virtual dot area grows within a first pixel area as a growth nucleus in the halftone spot area B of the second halftone spot group. The growing of the virtual dot is the same as in FIG. 5, and as seen from FIG. 8, the number of screen lines is increased. As shown in the step S2 in FIG. 15, in the look-up table, for the input picture image data, the output data indicative of a size of a virtual dot increase in a first pixel area B-1 as a growth nucleus pixel in the halftone spot area B. A density of the halftone spot areas B of the second halftone spot group is equal to that of the halftone spot areas A of the first halftone spot group, and hence an inclination of the increasing curve of the output data in the LUT is equal to that in the second group.

Figure 9:
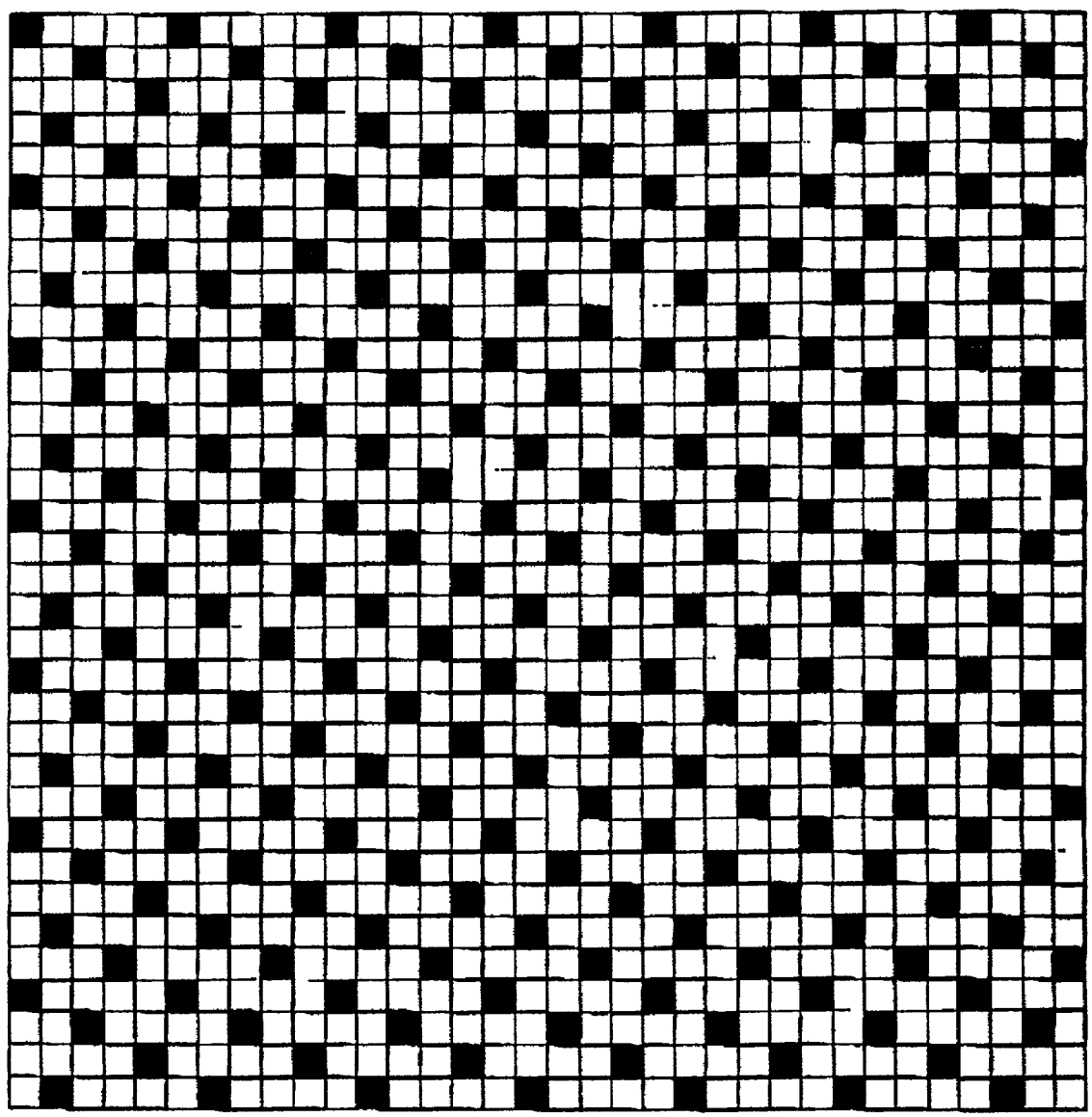
FIG. 9 is a diagram for explaining a growing process of halftone spots, which is carried out with increase of the gradation level.

In a step S3 of FIG. 9, there is shown A growing process of a halftone spot in a gradation area whose gradation level is higher than the last-mentioned one, a virtual dot area grows within a pixel area as a growth nucleus in the halftone spot area C of the third halftone spot group. The growing of the virtual dot is the same as in FIG. 6, and as seen, the number of screen lines is further increased. As shown in the step S3 in FIG. 15, in the look-up table, with increase of the input picture image data, the output data indicative of a size of a virtual dot increases in a first pixel area C 1 of a growth nucleus pixel in the halftone spot area C. In this step, a density of the halftone spot areas C of the third halftone spot group is two times as high as that of the halftone spot areas of the first or second halftone spot group, and hence, an inclination of the increasing curve of the output data in the LUT is ½ of that in the first or second group.

Figure 10:
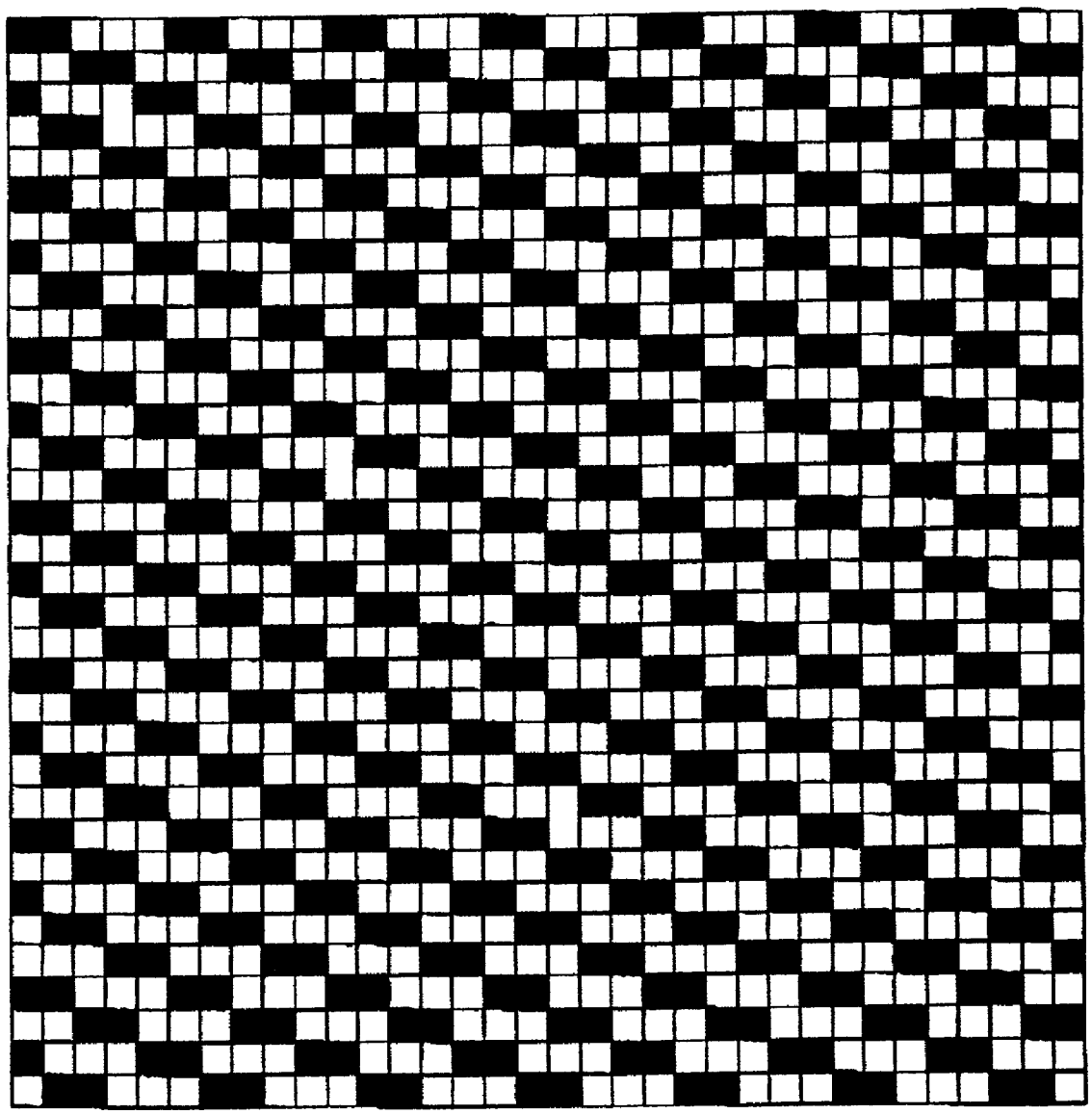
FIG. 10 is a diagram for explaining a growing process of halftone spots, which is carried out with increase of the gradation level.
Figure 11:
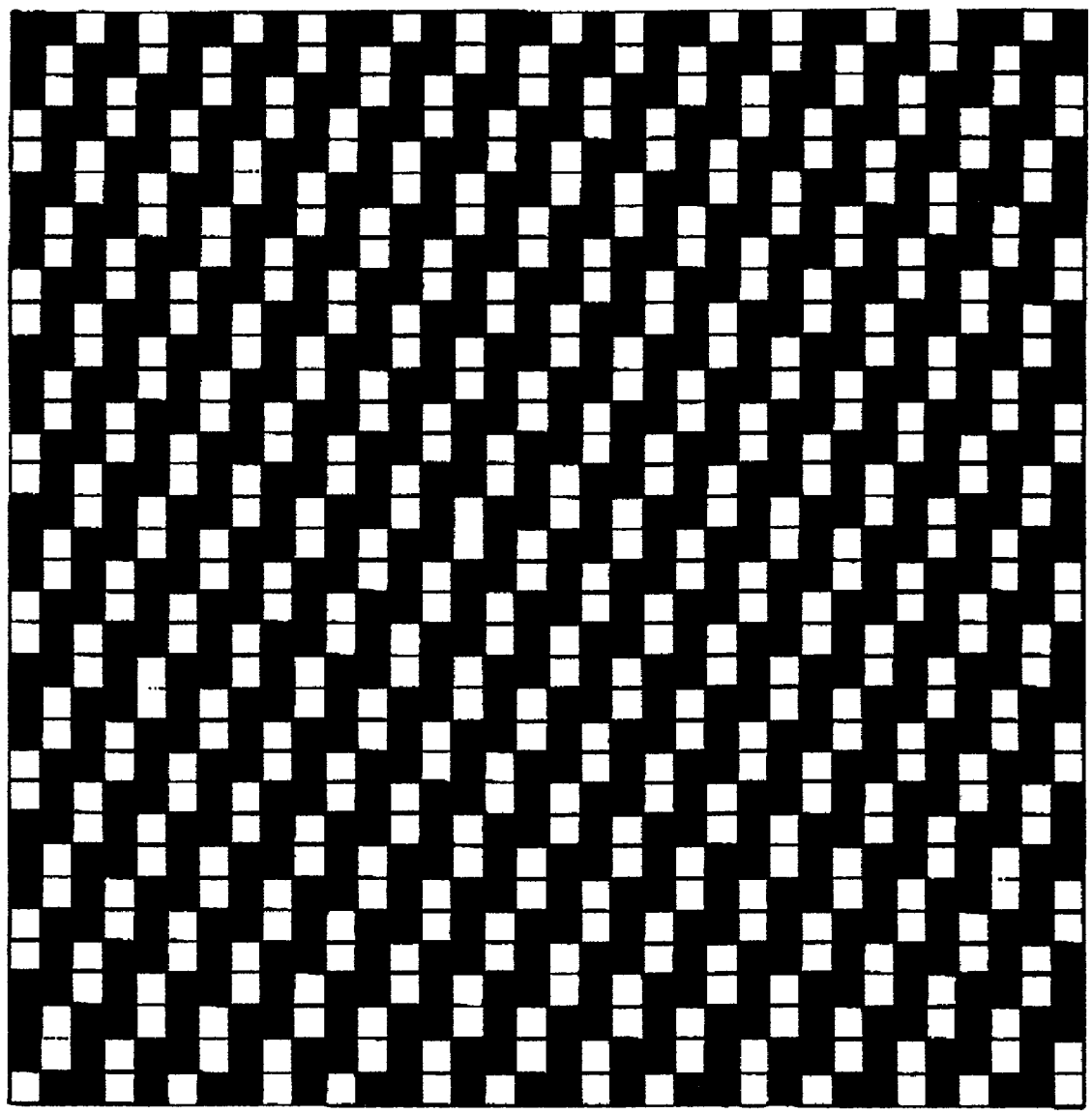
FIG. 11 is a diagram for explaining a growing process of halftone spots, which is carried out with increase of the gradation level.
Figure 12:
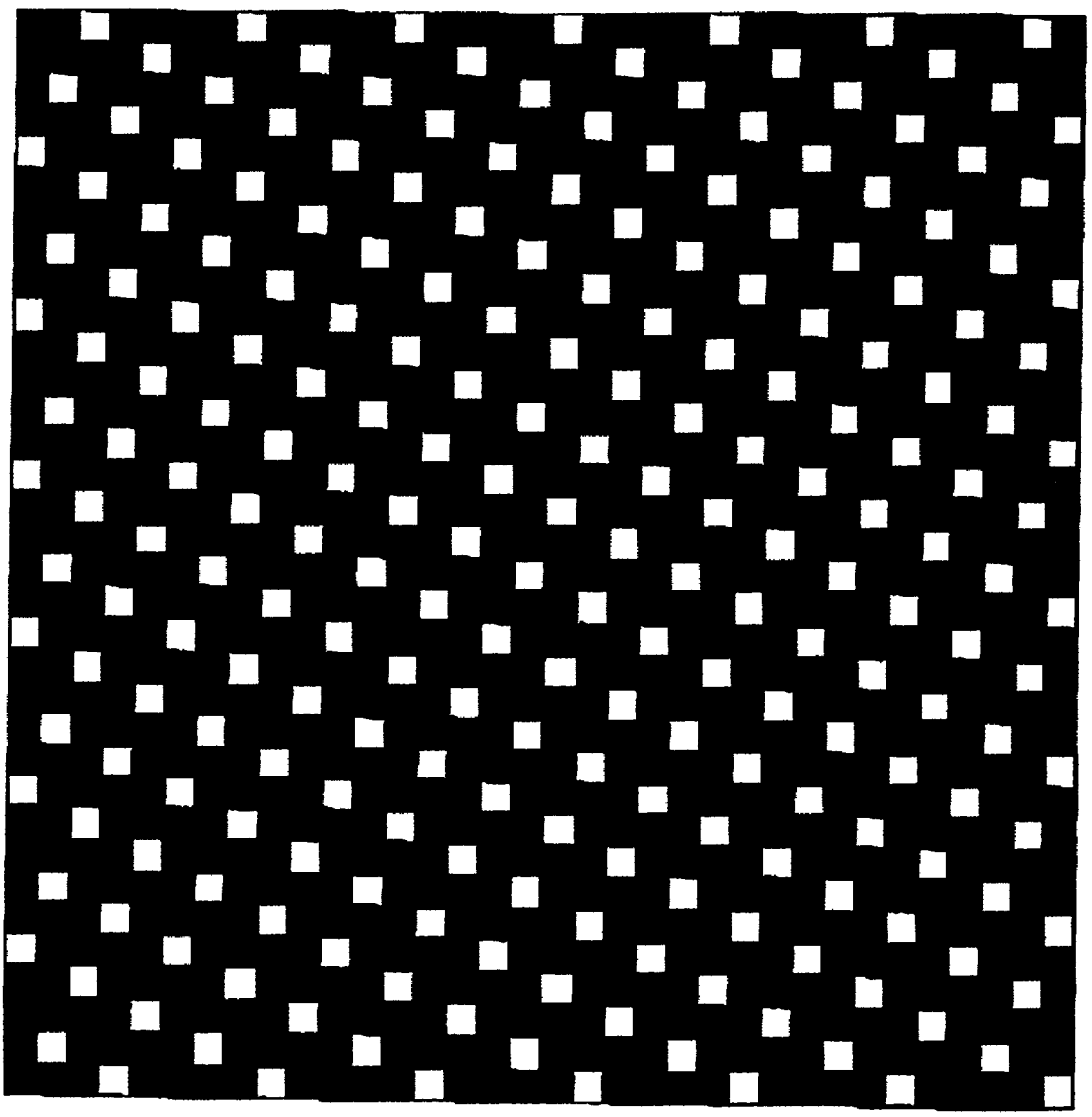
FIG. 12 is a diagram for explaining A growing process of halftone spots, which is carried out with increase of the gradation level.

In steps S5, S5, 35 in FIGS. 10, 11, 12, the virtual dot areas successively grow in the second pixel area (PX2 in FIG. 2), the third pixel area (PX3 in FIG. 2), and the fourth pixel area (PX4 in FIG. 2) of all the halftone spot areas A, B, C. When the gradation level is increased to a certain level, there is no need of attaching toner particles to a isolated, small virtual dot area. Accordingly, the instability of the electrophotography process is lessened within the engine. Therefore, after the growth nucleus pixels have grown in all the halftone spot groups, a final picture of high resolution and good sharpness can be reproduced by growing the virtual dot areas in all the halftone spot areas.

Accordingly, in the LUT of the step S4, as shown in the step S4 in FIG. 15, for the input picture image data as the gradation data of gradation levels, the virtual dot areas, output as data, of the second pixel areas A-2 B-2, C-2 In the halftone spot areas of all three halftone spot groups increase. An inclination of the increasing curve of the output data is ¼ of that in the steps S1 and S2, and ½ of that in the step S3 since the density of the growing halftone spots is 4 times as high as in the steps S1 and S2, an two times as high as in the step S3. Also in the steps S5 and S6, as shown in the steps S5 and S6 in FIG. 15, the virtual dot areas output as data successively increases in the third pixel areas A-3, B-3, C-3 and the four to pixel areas A-4, B-4, C-4.

Figure 13:
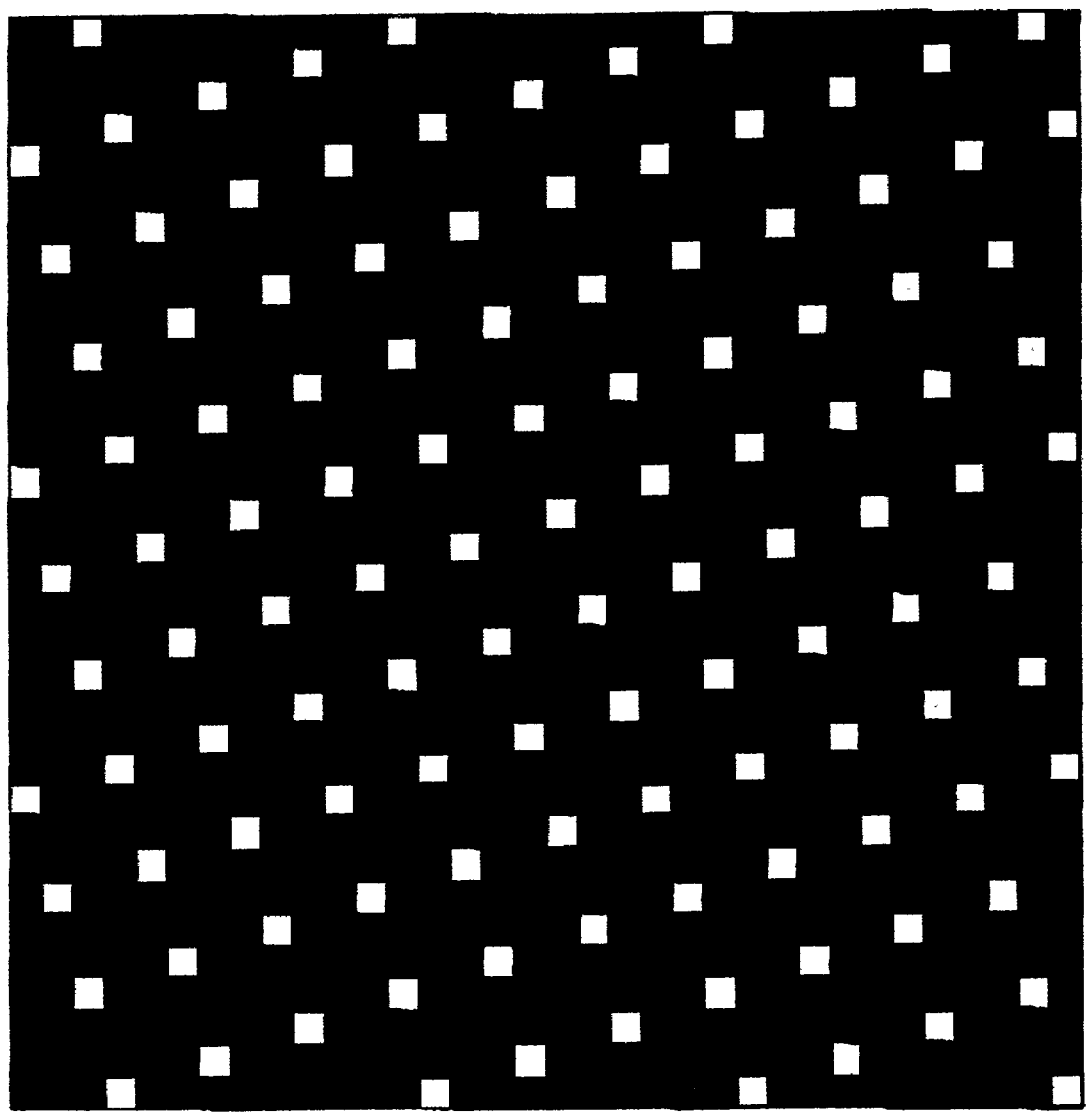
FIG. 13 is a diagram for explaining a growing process of halftone spots, which is carried out with increase of the gradation level.

In a step S7 of FIG. 13, the date range is high in gradation level, and in this area, black and white are inverted when comparing to the data range of low gradation levels. Accordingly, the electrophotography process is instable within the engine for similar reasons. Therefore, it is preferable to grow the halftone spots so as to minimize the other areas than the virtual dot areas (void areas in FIG. 13). In the step S7 of FIG. 13, as in the step S3, the virtual dot area is made to grow in the fifth pixel area (pixel PX5 in FIG. 2) in the halftone spot area C of the third halftone spot group. Accordingly, the image in the area of FIG. 13 and the image of the step S2 of FIG. 8 are related to each other in a positive and negative relation. In other words, the number of lines interconnecting the void areas is reduced in the image appearing at the end of the step S7.

In the LUT in the step S7, as shown in the segment of S7 of FIG. 15, the virtual dot area in the fifth pixel C-5 in the halftone spot area C grows. As seen, an inclination of the increasing curve of the output data is equal to that in the case of the step S3.

Figure 14:
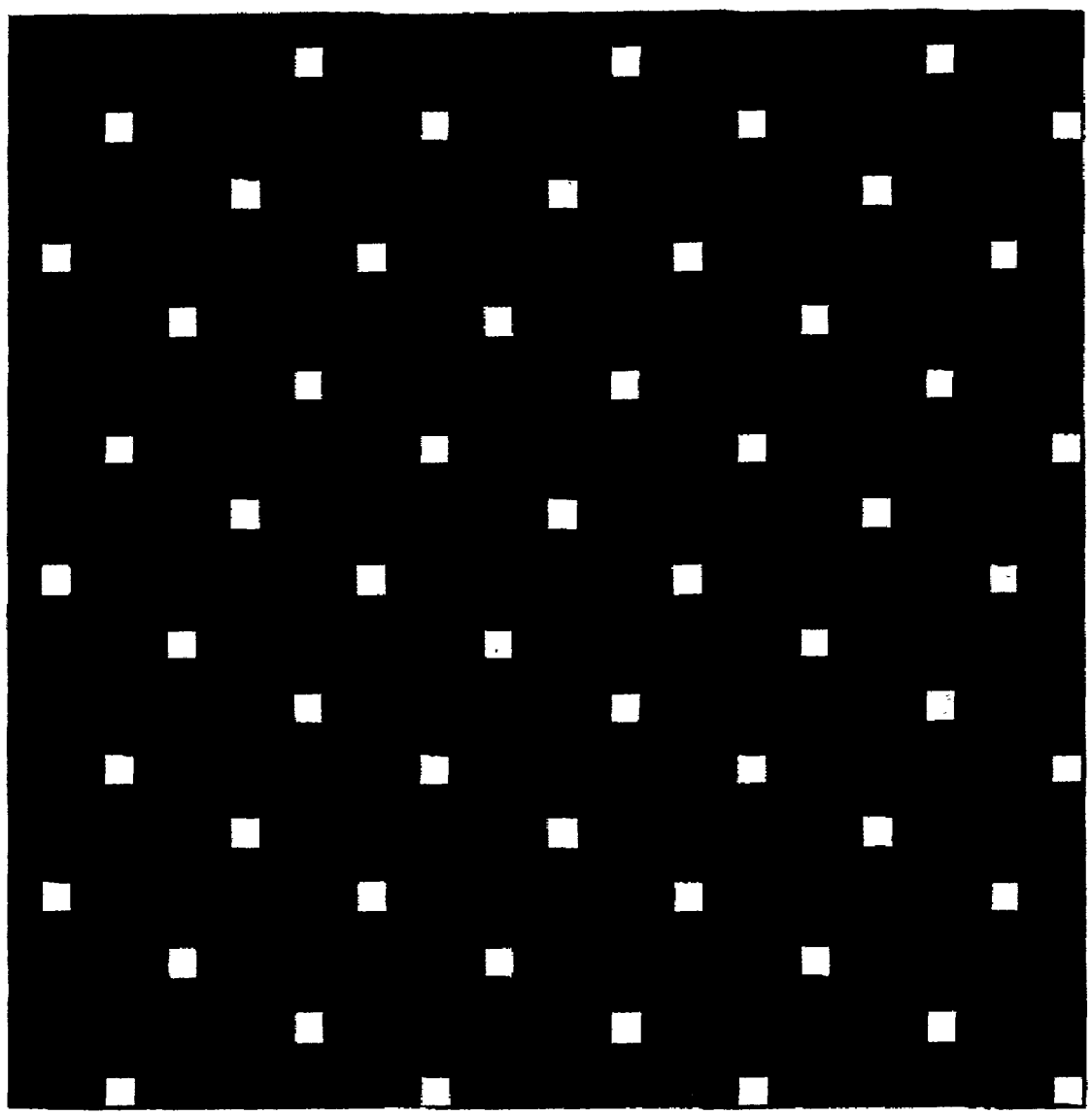
FIG. 14 is a diagram for explaining a growing process of halftone spots, which is carried out with increase of the gradation level.
Figure 15:
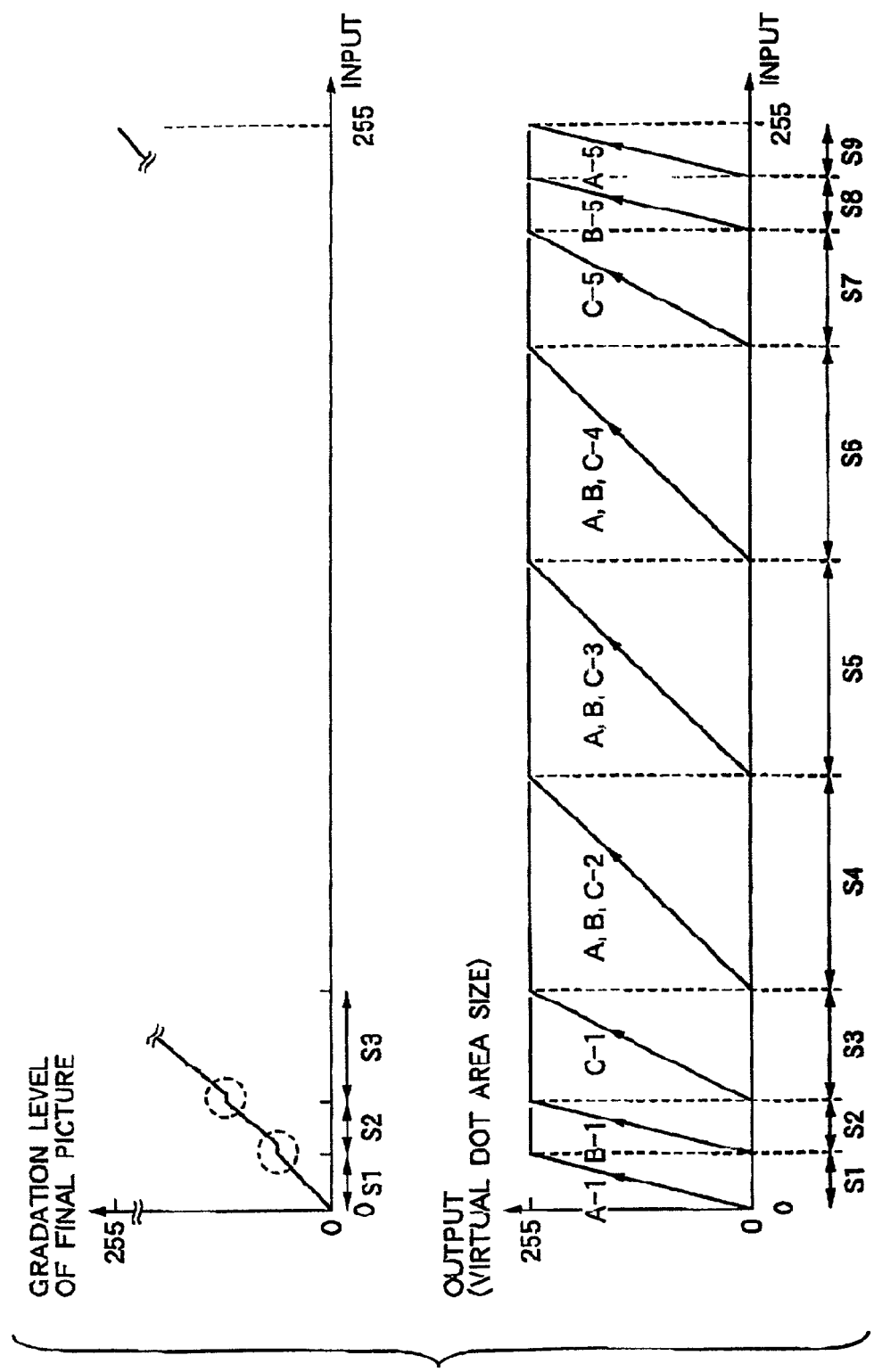
FIG. 15 is a graph showing the characteristic of a conversion table (look-up table), which is contained in a half tone processing part in the electrophotographic apparatus.

In a step S8 of FIG. 14, there is shown a growing process of a halftone spot in a gradation area whose gradation level is higher than that of the last-mentioned one, a virtual dot area grows within a fifth pixel area (PX5 in FIG. 2) as a growth nucleus in the halftone spot area B of the second halftone spot group, with increase of the gradation level. A look-up table in this step is as shown in a segment of S8 in FIG. 15, and an inclination of the ascending curve of the output data is equal to that in the step S2.

The final step S9 is carried out in a gradation area of the highest gradation level (not shown), and a virtual dot area grows within a fifth pixel area in a half-one spot area of the first halftone spot group. After the growing of the virtual dot areas ends, all the halftone spots are maximized in size, and the virtual dot areas are formed filling the entire image area. A look-up table in this step is as shown in a segment of S9 in FIG. 15, and ad inclination of the ascending curve of the output data is equal to that in the step S1.

The growing process of the halftone spots for suppressing the instability in the electrophotography process is carried out as mentioned above. In a data range of low gradation levels, sensitive to human eyes, a density of growing halftone spots is reduced, and the growing rate of the halftone spot is increased with increase of the gradation level, thereby suppressing a probability that isolated, small virtual dot areas occur. In other words, the inclination of the increasing curve of the output data is made steep.

The halftone spot growing process may be modified such that the virtual dots in the fifth pixel areas of the three halftone spot groups are made to simultaneously grow.

Figure 1:
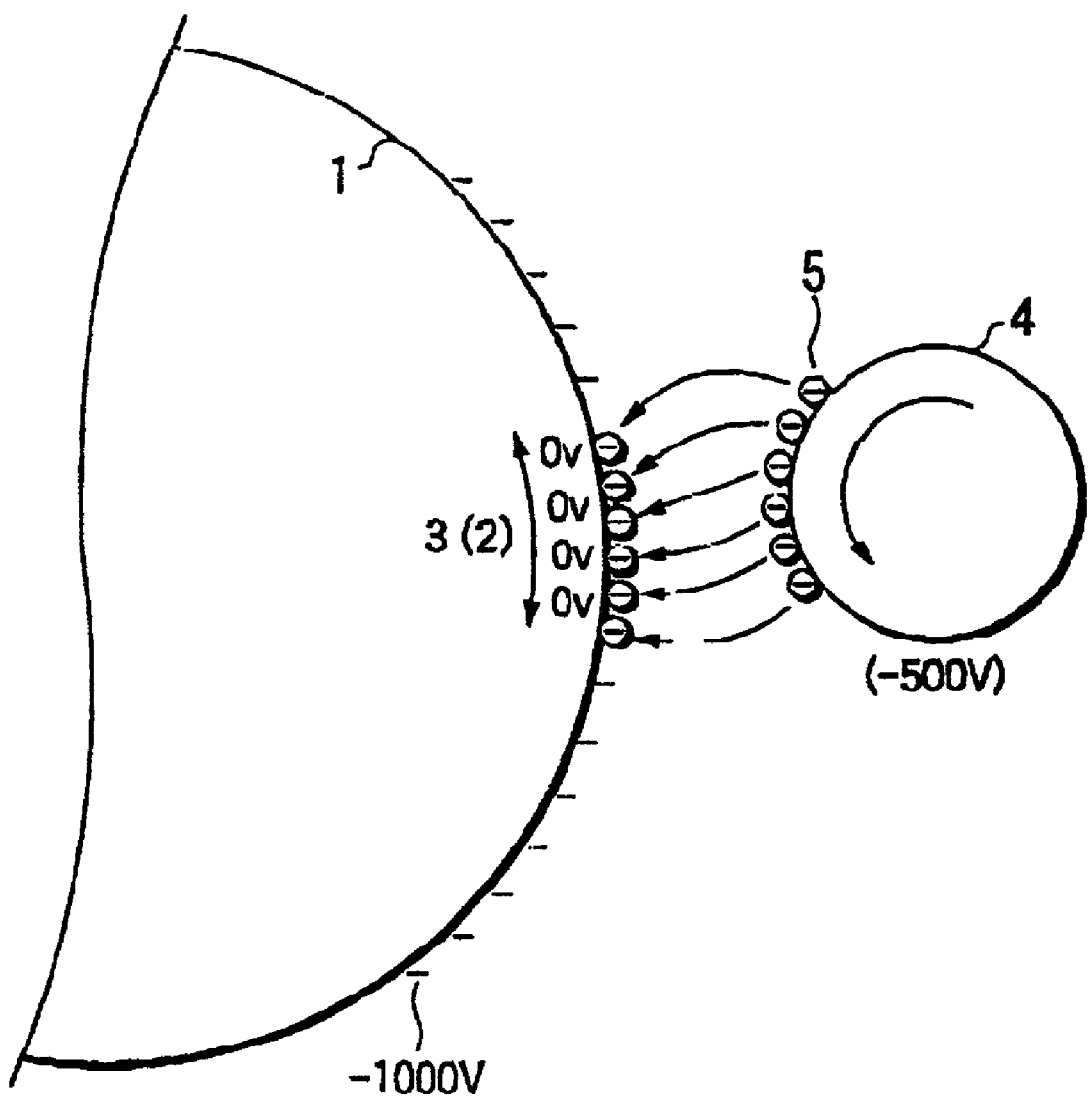
FIG. 1 is a diagram for showing a developing process in a general electrophotography process.

FIG. 16 is a diagram for explaining the edge effect As described referring to FIG. 1, the edge effect is a phenomenon that when charged toner is excessively supplied t-n the latent image area, a large amount of toner is attached to a peripheral part of the latent image area, when comparing to the remaining area. In FIG. 16, the abscissa represents a space, a distance or the like, and the ordinate represents latent image potential (indicated by solid lines) and an optical density (O.D.) of attaching toner (indicated by broken lines).

In a latent image area 20 of (1) in FIG. 16, which is relatively thick, an O.D. 21 of toner attaching to the periphery part is higher than in the remaining part. This tendency is observed also in a latent image area 22 having some width as by a toner O.D. profile 23. As the virtual dot area becomes narrower in width, the potential of the latent image area becomes lower, as seen from the illustration of latent image areas 24 and 26. In this case, however, as illustrated, O.D. 25 and 27 of the toner attached as the result of the edge effect tend to be high as in the case of the thick latent image areas 20 and 22.

A diagram of (2) in FIG. 16 shows that the edge effect is suppressed depending on the density of virtual dot areas. When a narrow virtual dot area (latent image area) is solely present as indicated by a pattern 28, an attaching toner O.D. 29 by the edge effect is relatively high by the edge effect as in the cases of the latent image 24 and the like. Accordingly, the latent image is reliably reproduced in the form of dot picture. In case that as in a pattern 30, the virtual dot area (latent image areas) are more closely located at higher density than as in the pattern 28, the edge effect is suppressed, an O.D. 31 of toner attaching to related latent images decreases, and a probability of reproducing the latent image as dot pictures is reduced.

Thus, the edge effect is intensified or lessened depending on the density of the virtual dot areas (latent image areas) Accordingly, where the halftone spot growing process mentioned above is employed, the gradation of the final picture is improperly reproduced in the data range of low gradation levels.

A graph in the upper part in FIG. 15 shows a relationship between input gradation data expressed in terms of gradation level and gradation levels of the final picture. As described above, in the data range of the lowest gradation level, as shown in step S1, the virtual dot area grows within the growth nucleus A-1 in the halftone spot areas A of the first halftone spot group. In the data range whose gradation is higher than the above-mentioned one, as shown in the step S2, the virtual dot area grows within the growth nucleus B-1 in the halftone spot areas B of the second halftone spot group. At the boundary between those steps, the density of the generated halftone spots is increased to be two times as high as that in the previous step. Accordingly, the edge effect is suppressed at the transient point from the step S1 to the step S2, at which the density of virtual dot areas forming halftone spots is doubled, as referred to in connection with (2) in FIG. 16. Therefore, the gradation of the final picture incrementally varies in a stepwise fashion, and a curve representing the gradation variation has parts as enclosed by broken lines in FIG. 15. Or, in an extreme case, the gradation in the final picture is inverted. This results in deterioration of the final picture quality. The same phenomenon occurs also at the boundary between the steps S2 and S3.

A unique technique for removing the halftone spot density dependency of the edge effect will be described with reference to (3) in FIG. 16. In a pattern 32, a narrow latent image area 33 is solely present as of the pattern 28, and fine virtual dot areas, which will not be developed, at positions near the. narrow latent image area, whereby latent image areas 34 and 35 are formed. In a pattern 38, narrow latent image areas 39 and 4O are present while being closely located, and a fine virtual dot area is generated at a position near it, whereby a fine latent image area 41 is formed.

A halftone spot density of the pattern 32 is different from that of the pattern 38, and the virtual dot areas (latent image areas) are equal in density. Accordingly, the edge effect in both the patterns 32 and 38 is suppressed in like level. The same thing is true for the attaching toner O.D.

Figure 18:
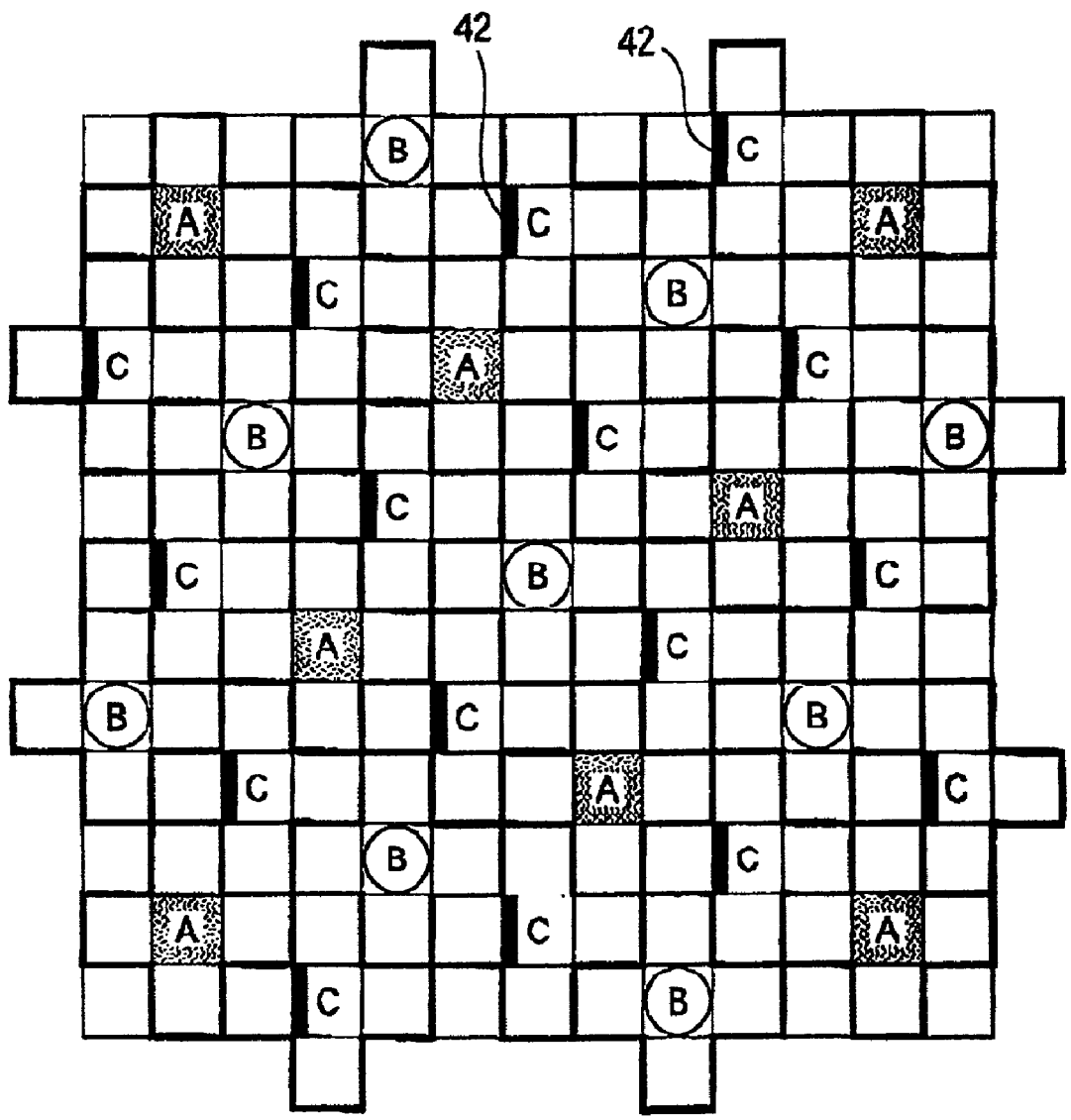
FIG. 18 is a diagram for explaining the first halftone spot growing process in the embodiment.
Figure 19:
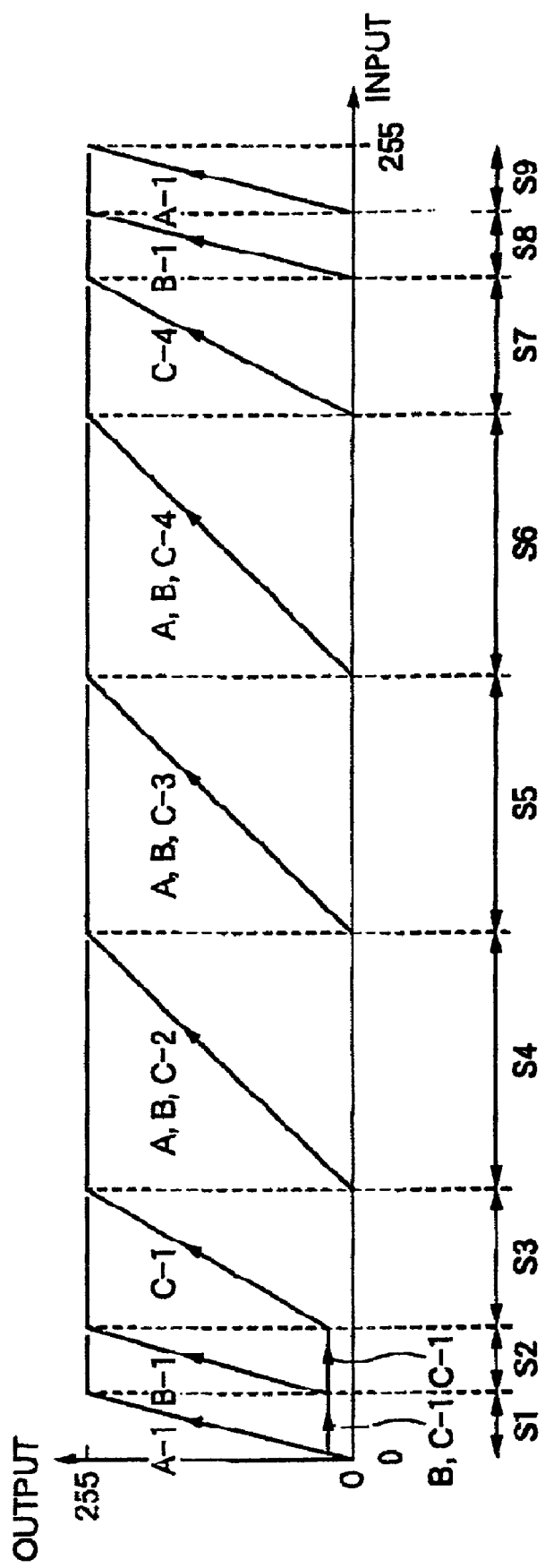
FIG. 19 is a graph showing the characteristic of a look-up table used for the first halftone spot growing process.

The unnatural gradation variations in a final picture, which are caused when the halftone spot density varies at the boundary between the steps S1 and S2 and the boundary between the steps S2 and S3, can be suppressed by the utilization of the principle mentioned above. FIGS. 16 and 17 are diagrams for explaining a first halftone spot growing process in the embodiment of the invention FIG. 17 shows the halftone spot growing step S1 in the first halftone spot growing process, and FIG. 18 shows the halftone spot growing step S2 in the same process. FIG. 19 is a graph showing the characteristic of a look-up table used for realizing the first halftone spot growing process.

The first halftone spot growing process follows. As shown in FIG. 17, in the halftone spot growing step S1 for the data range of the lowest gradation level, a virtual dot area is made to grow with increase of the gradation level in a growth nucleus pixel A-1 in the halftone spot area A of the first halftone. spot group. Fine virtual dots 42 which are thin enough to fail to develop those virtual dots are actually generated in the growth nucleus pixels B-1 and C-1 or the halftone spot areas B and C of the second and third halftone spot groups. Thus, the fine virtual dots 42 are generated in the halftone spot areas other than the halftone spot area A of the first halftone spot group. With the generation of the fine virtual dots, a density of the fine virtual cots is increased in each of those halftone spot areas, thereby suppressing the edge effect.

Similarly, as shown in FIG. 18, in the halftone spot growing step S2 of the data range of which the gradation level is next to the above mentioned one in its lowness, a virtual dot area is made to grow with increase of the gradation level in a growth nucleus pixel B-1 in the halftone spot area B of the second halftone spot group. Fine virtual dots 42 which are thin enough to fail to develop those virtual dots are actually generated in the growth nucleus pixels C-1 of the halftone spot areas C of the third halftone spot group. As a result, a density of the fine virtual dots in the step S2 is equal to that in the step S1, thereby suppressing the edge effect at almost the same degree as in the previous step.

In the steps S1 and S2, the fine virtual dot areas are generated as mentioned above. Since those dot areas are extremely thin, the resultant latent image areas are insufficient in potential. Accordingly, those fine virtual dot areas are not developed into dot pictures, and do not appear in the final image. Therefore, even if the fine virtual dots are generated, a gradation of the final picture corresponds to that of the input picture image data. Further, the number of screen lines of the final picture also remains unchanged in the steps S1 and 82 even if the fine virtual dots 42 are generated.

In the halftone spot growing step S3, as described in connection with FIG. 6, a virtual dot area is made to grow in the growth nucleus pixel C-1 of the halftone spot area C of the third halftone spot group. Accordingly, d density of virtual dot areas in this step is equal to that in each of the steps S1 and S2.

The process of generating the virtual dot areas in the steps will be better understood when referring to a look-up table shown in FIG. 19. In the step S1, for the input picture image data, output picture reproducing data is generated such that the pixel A-1 of the halftone spots of the first halftone spot group grow, and fine virtual dots grow in the pixels B-1 and C-1 of the halftone spots of the second and third halftone spot groups. The step S2 produces such output picture reproducing data that at completion of the growing of the pixel A-1 in the First halftone spot group is completed, a virtual dot arcs grows in the pixel B-1 in the second halftone spot group, ant a fine virtual dot area is generated in the pixel C-1 in the third halftone spot group. In the step S3, at completion of the growing of the halftone spot areas in the pixels A-1 and B-1 of the first and second halftone spot groups, a virtual dot area grows in the pixel C-1 of the third halftone spot group.

A density of the virtual dot areas in each of the steps S1 to S3 is kept constant. Therefore, there is no chance that the edge effect changes at the boundaries of those steps. As a result, a gradation variation in the final picture is smooth as in the input picture image data. There is no chance that the gradation of the final picture stepwise varies as shown in FIG. 15, and that the gradation variation is inverted in its direction.

In the data range of which the gradation is at the highest level or therearound, there is no change of the edge effect. Accordingly, as shown in FIG. 19, the look-up tables in the steps S7, S8 and S9 are the same as those in FIG. 15.

As aforementioned, according to the present invention, the gradation of the dot pictures is simply increased by the image processing unit without decrease at a boundary between said first and second data ranges, at which the gradation of the dot pictures does not increase under normal circumferences.

Figure 21:
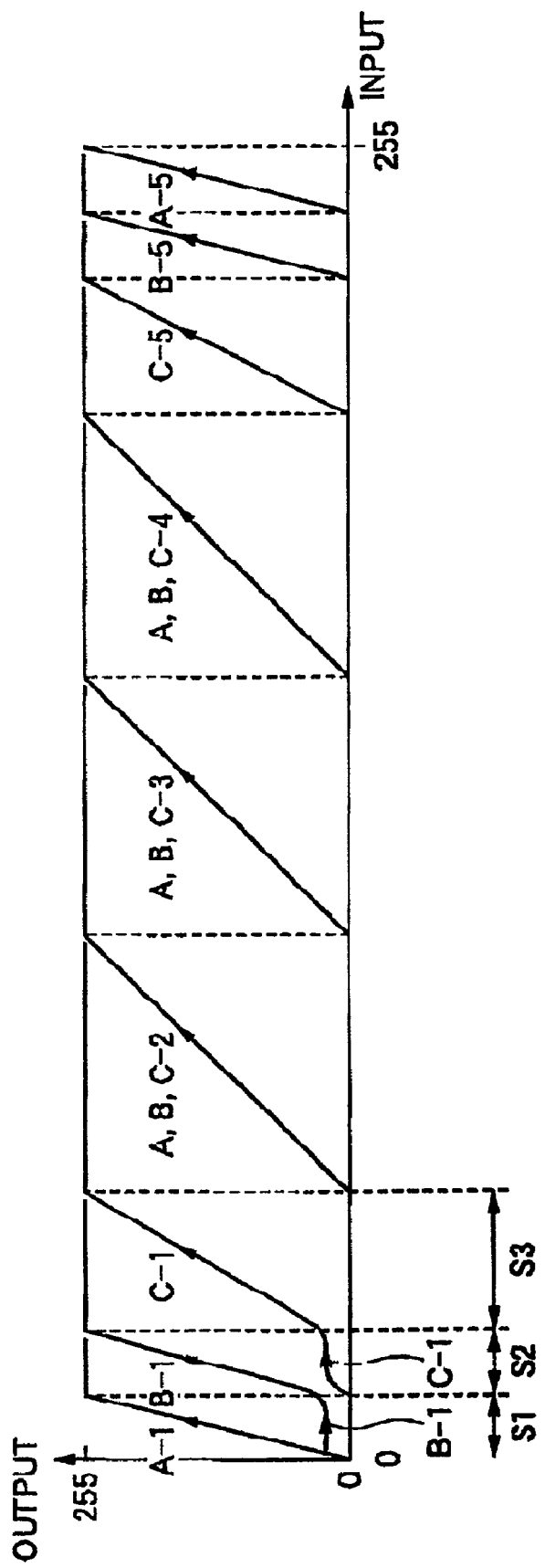
FIG. 21 is a graph showing the characteristic of a look-up table used for realizing the second halftone spot growing process.

FIG. 20 is a diagram for explaining a second halftone spot growing process in the embodiment of the invention. FIG. 21 is a graph showing the characteristic of a look-up table used for realizing the second halftone spot growing process. FIG. 20 shows a halftone spot growing process in the step S1. In the halftone spot growing step S1 for the data image of the lowest gradation level, a virtual dot area grows in the pixel A-1 in the halftone spot area A of the first halftone spot group, and a fine virtual dot, which will not he developed, is generated in the pixel B-1 in the halftone spot area B of the second halftone spot group. Accordingly, as shown in the look-up table of FIG. 21, in the step S1, the virtual dot areas are generated in the halftone spot areas A and B of the first and second halftone spot groups, thereby suppressing the edge effect.

In the second halftone spot growing process, the halftone spot growing process of the step S2 is the same as in the first halftone spot growing process. Specifically, the virtual dot area maintains its maximum size in the growth nucleus pixel in the halftone spot area A of the first halftone spot group, and the virtual dot area grows in the growth nucleus pixel B 1 in the halftone spot area B of the second halftone spot group. Further, a fine virtual dot grows in the halftone spot area C of the third halftone spot group Also this step, a density of the virtual dot areas is high, and the edge effect is successfully suppressed.

In the second halftone spot growing process, the number of fine virtual dots 42 is reduced to be smaller than that formed in the step S1 in the first halftone spot growing process. For this reason, even if the fine virtual dots 42 are developed into dot pictures as the result of the varied characteristic of the electrophotography process in the engine, a variation of gradation in the final picture, which is caused by the developed fine virtual dots, is suppressed when comparing with the case based the first halftone spot growing process, because the number of fine virtual dots 42 is reduced.

Also in the second halftone spot growing process, a density of the virtual dot areas in the step S2 is equal to that in the step S3. Therefore, the second halftone spot growing process succeeds in suppressing the unnatural variation of the gradation in the final picture, which results from the variation of the edge effect.

Figure 22:
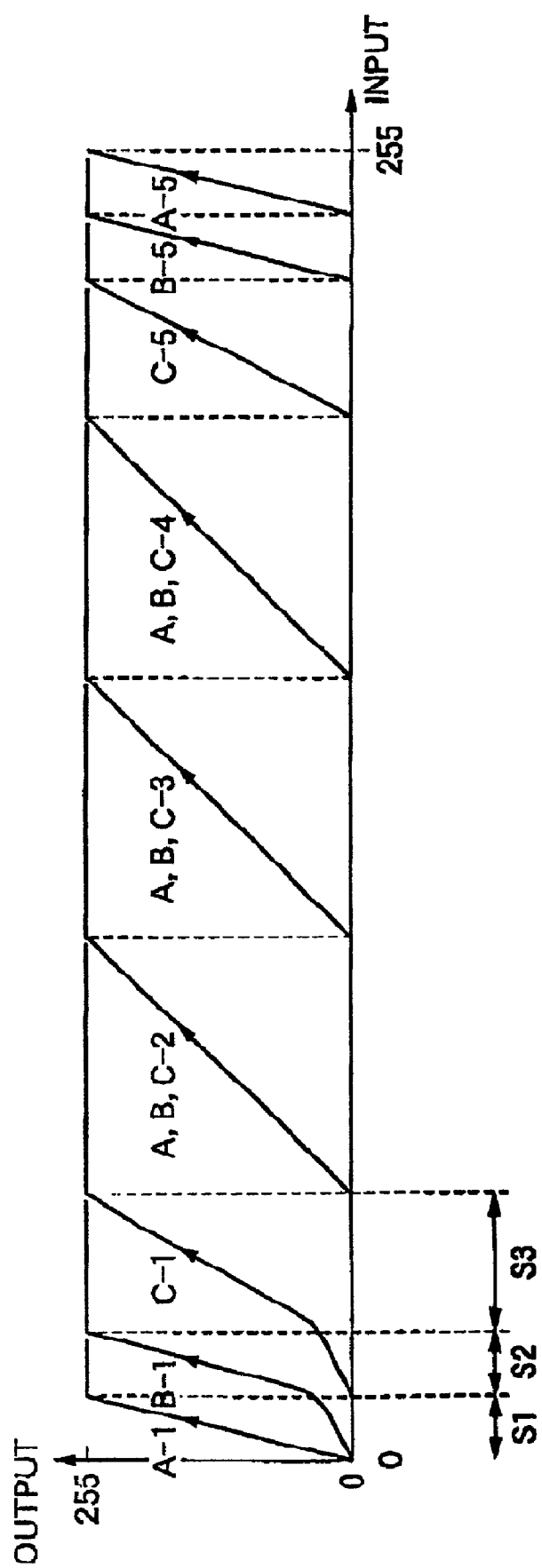
FIG. 22 is a graph showing the characteristic of a look-up table used for realizing the third halftone spot growing process.

FIG. 22 is a graph showing the characteristic of a look-up table used for realizing the third halftone spot growing process. The third halftone spot growing process is a modification of the second halftone spot growing process. In the halftone spot growing step S1, a virtual dot area grows in the pixel A-1 in the halftone spot area A of the first halftone spot group, and a fine virtual dot, which will not be developed, is made to gradually grow from zero in the pixel B-1 in the halftone spot area B of the second halftone spot group. In this case, the fine virtual dot area is sized so as not to be developed even if its size is a maximum size. Accordingly, the virtual dot area density is not varied at least at the boundary between the steps S1 and S2 and the boundary between the steps S2 and S3. Hence, the edge effect variation is also suppressed. Further, as in the second halftone spot growing process, the number of fine virtual dot areas is reduced in the step S1, thereby suppressing a variation of the gradation in the final picture, which is caused when the fine virtual dot areas are developed as the result of the variation of the characteristic of the electrophotography process.

FIG. 23 is a diagram for showing an example of the look-up table. This look-up table is used for the first halftone spot growing process. Input data 65, which results from the color conversion of the input picture image data 56, is supplied to the half-tone processing part 66 of FIG. 3. The input picture image date corresponds to a pixel, as the result of the rasterizing process, as shown in (1) in FIG. 23. The conversion table in the half-tone processing part contains an LUT matrix of (2) in FIG. 23, and a look-up table group of (3) in the same figure. The LUT matrix is an index table which shows the pixels of the input picture Image data and the look-up tables to be referred to in association with them. Specifically, for the pixel P in (1) in FIG. 23, the index A 1 in the LUT matrix is referred to. Accordingly, a look-up table A-1, which is associated with the first pixel A-1 in the halftone spot area A of the first halftone spot group, is referred to. The LUT matrices are replicatively applied to the pixels of the input picture image data, as tiled.

Look-up tables of the first pixels A-1, B-1 C-1, the second pixels A-2, B-2, C-2, and the fifth pixels A-5 of the halftone spot areas are shown, by way of example, in the look-up table group. The gradation levels from 0 to "i 1" of the input gradation data are assigned to the step S1. In this stop, in the look-up table of the first pixel A-1 of the halftone spot of the first halftone spot group, the output value representative of the size of the virtual dot area is incremented from 0 to 255 (input and output data each consist of 8 bits). in the first pixels B-1 and C-1 of the second and third halftone spot groups, the output values are each "5", and fine virtual dot areas are generated in those pixels.

The input values from i to "j–1" are assigned to the step S2, and the output value representative of the size of b the virtual dot area is incremented from 5 to 255 in the look-up table of the first pixel B-1 of the halftone spot of the second halftone spot group. In this case, in the first pixel C-1 of the halftone spot of the third halftone spot group, the output value is "5", and a fine virtual dot area is generated in the pixel.

The input values from j to "k–1" are assigned to the step S3, and in this step, the output value representative of the size of the virtual dot area is incremented in the look-up table of the first pixel C-1 of the halftone spot of the third halftone spot group. An inclination of the increasing curve of the output data in the LUT is ½ of that in the tables A-1 and B-1. The input value of k or larger are assigned to the step S4 and the subsequent ones. In the look-up tables of the second pixels A-2, B-2, C-2 or the halftone spots of the first to third halftone spot groups, the output values of the sizes of the virtual dot areas are incremented simultaneously. An inclination of the increasing curve of the output data in the LUT is ¼ of that in the tables A-1 and B-1.

Thus, the growing of the virtual dot areas of the output data, which is performed with increase of the gradation level of the input picture image data, can be varied as desired by using the look-up tables.

Next, a fourth halftone spot growing process will be described. FIG. 24 is a diagram useful in explaining the edge effect in the fourth halftone spot growing process. Graphs of (1) and (2) in FIG. 24 resembles those of (1) and (2) in FIG. 16, used for explaining the problem of the edge effect. A graph of (3) In FIG. 24 is used for explaining the fourth halftone spot growing process for suppressing the edge effect. A pattern 32 represents a latent image distribution in an area of the gradation level G1. As shown, a single latent image area 33 is generated, and this latent image area has a toner O.D. 34. A pattern 38 represents a latent image distribution over an area having a gradation level G2, higher than the gradation level G1. As shown, a growing latent image area 35 and a latent image area 36, which starts to grow, are contained in this pattern. Accordingly, the latent image area 35 is larger than the latent image area 33 of the pattern 32.

In a transient part, as in a transient part from the Step S1 to the step S2, where the pixel of halftone spot area A has grown and the pixel of halftone spot area B starts to grow, the density of the virtual dot area abruptly increases, and it is greatly affected by the variation by the edge effect. However, the influence of the variation by the edge effect can be suppressed in a manner that the latent image area 33 is made to grow to the latent image area 35, and during the growing, a new latent image area 36 starts to grow, as shown in (3) of FIG. 24. The reason for this is that if do done, even if the density of the virtual dot area increases, the latent image area 35 has grown to have a large size. As a result, the gradation of the final picture can be properly reproduced corresponding to the increase of the gradation of the input picture image data.

Figure 25:
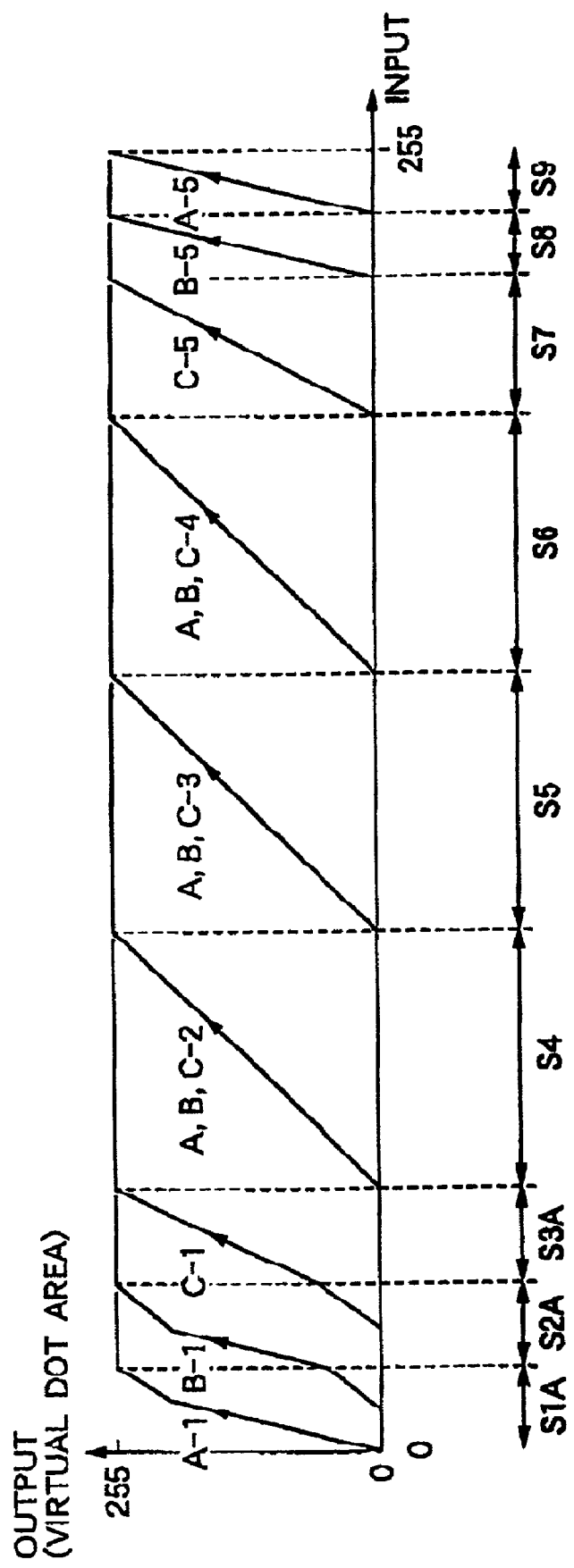
FIG. 25 is a graph showing the characteristic of a look-up table used for the fourth halftone spot growing process in the embodiment.
Figure 27:
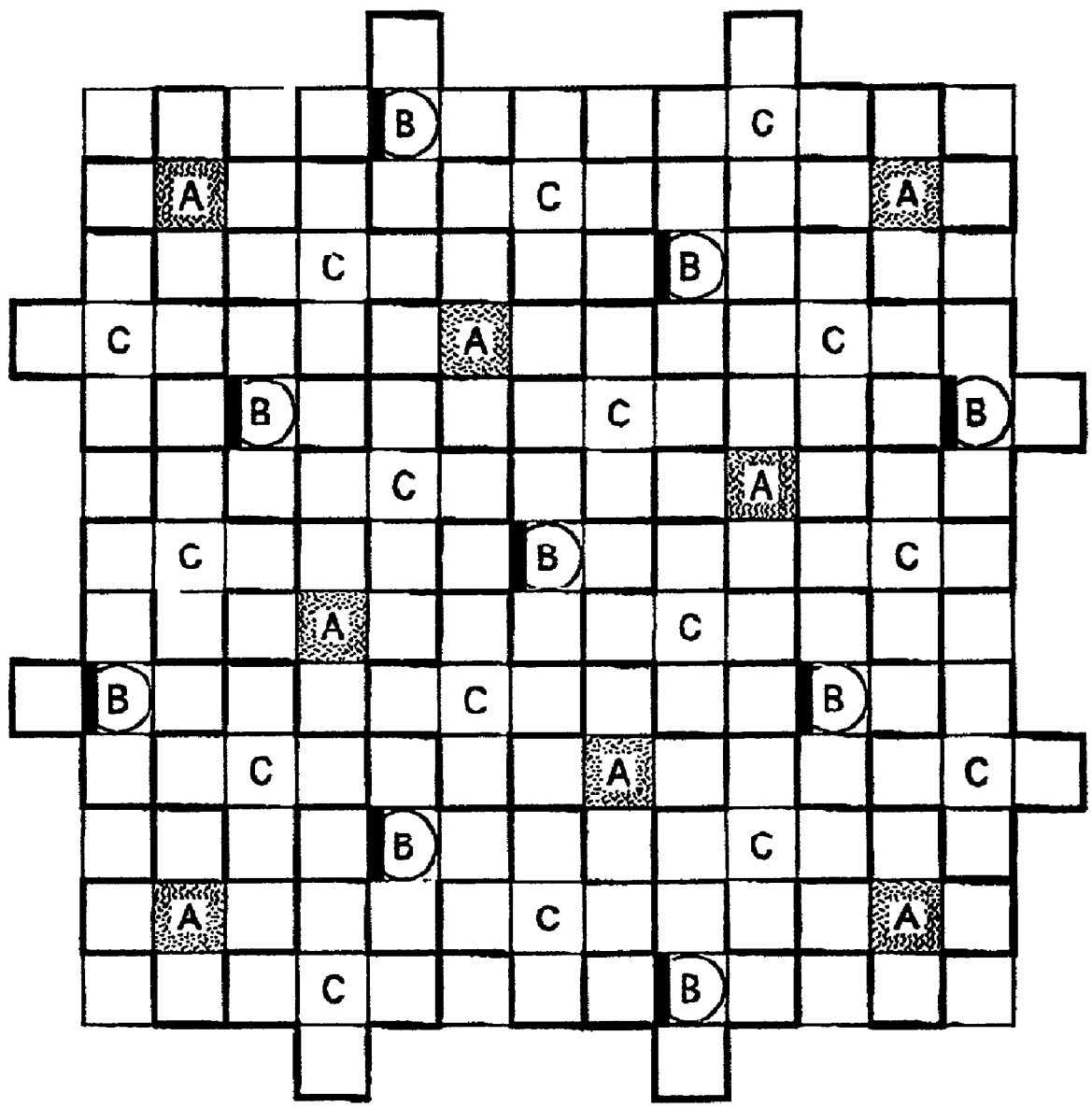
FIG. 27 is a diagram for explaining the growing of halftone spots by the fourth halftone spot growing process.
Figure 28:
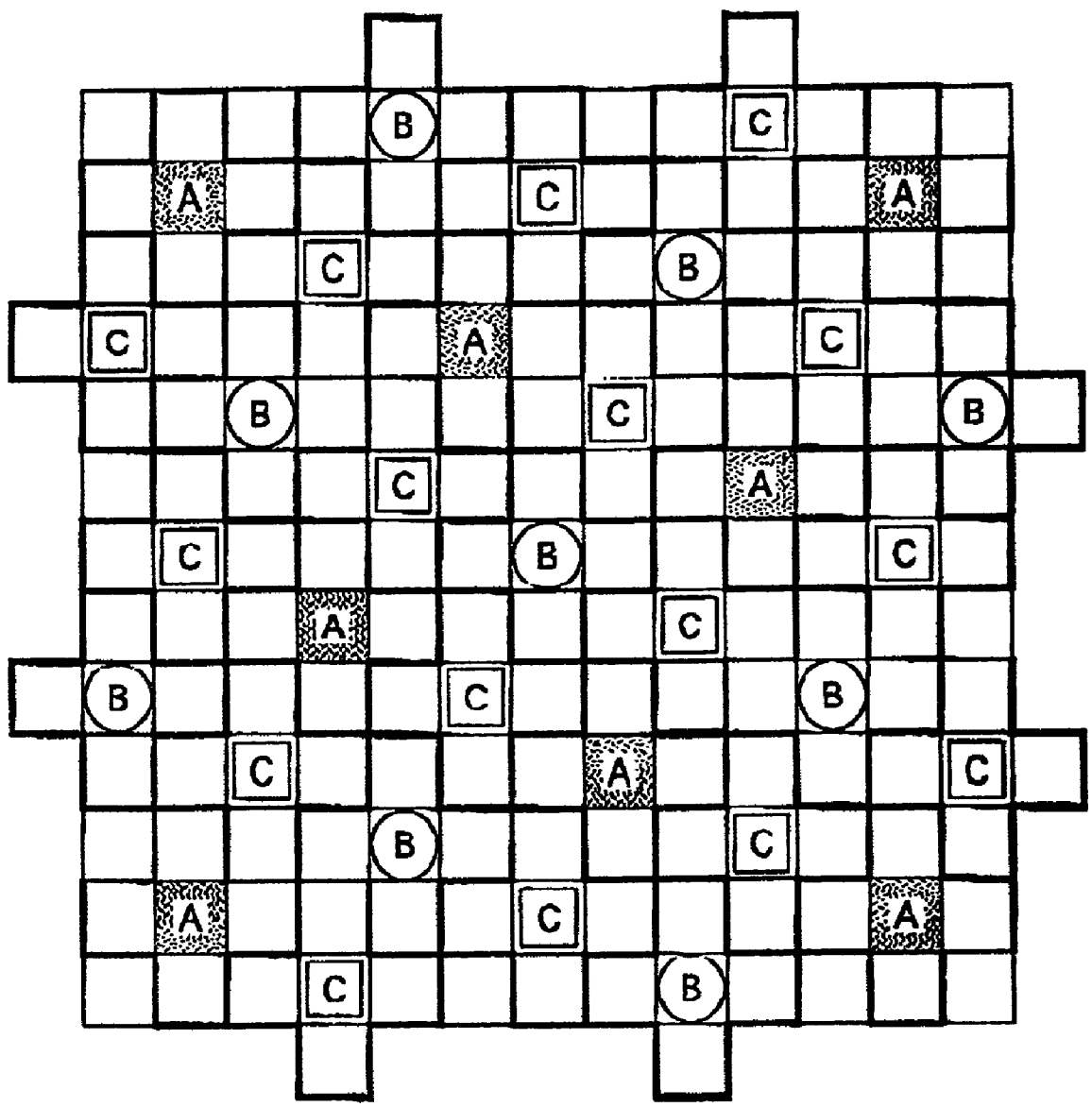
FIG. 28 is a diagram for explaining the growing of halftone spots by the fourth halftone spot growing process.

FIG. 25 is a graph showing the characteristic of a look-up table used for the fourth halftone spot growing process based on the above-mentioned principle in the embodiment. FIGS. 26 through 28 are diagrams for explaining how the halftone spots grow by the fourth halftone spot growing process. In the halftone spot growing process, steps S1A to S3A to be described below are used for the halftone spot growing steps S1 to S3 already stated.

In this step S1A for the data range of the lowest gradation level, as shown in FIG. 26, a virtual dot area grows in only the growth nucleus pixel A-1 of the halftone spot area A of the first halftone spot group. As a result, a probability at which the fine virtual dot area occurs is reduced, and a picture of low gradation levels can be properly reproduced with less influence by the output variation of the electro-photography process. Further, as shown in FIG. 27, in the middle of the step S1A, during the growing of the virtual dot area in the growth nucleus pixel of the halftone spot area A of the first halftone spot group, a virtual dot starts to grow in a growth nucleus pixel B-1 of the halftone spot area B of the second in halftone spot group. Thus, when the virtual dot starts to grow in the growth nucleus pixel B-1, the growing of the virtual dot area in the growth nucleus pixel A 1 in the halftone spot area A continues. When the virtual dot starts to grow in the growth nucleus pixel B-1, then a halftone spot density is stepwise incremented, thereby suppressing the edge effect. At this time, the growing of the virtual dot area in the growth nucleus pixel A-1 in the halftone spot area A continues, and hence, there is no chance that the increase of the gradation level of the final picture is improperly suppressed or its gradation is inverted.

Also in the step S2A for the data range of which the gradation is higher than that in the previous step, only the virtual dot area of the growth nucleus pixel B-1 in the halftone spot area of the second halftone spot group grows in the first half of the step. In the second half, a growth nucleus pixel C-1 starts to grow also in a halftone spot area C of the third halftone spot group, in addition the growing of the growth nucleus pixel B-1. Thus, as shown in FIG. 28, in the second half of the step S2A, the virtual dot areas grow in the growth nucleus pixels of the halftone spot areas B and C.

Also in this case, when the virtual dot starts to grow in the halftone spot area C, the growing of the virtual dot in the halftone spot area B continues. Accordingly, the influence of the variation by the edge effect when the density of the growing halftone spots increases is lessened.

In the subsequent step S3A, the virtual dot area grows as in the step S3. The growing of the virtual dots in the steps S4 to S9 of the data range of high gradation levels is substantially the same as in the FIG. 15 case.

As described above, in the fourth halftone spot growing process, unlike the FIG. 15 process, when he number of halftone spot areas growing in the data range of low gradation levels is increased, the growing of additional halftone spots is started during the growing of the halftone spots, thereby lessening the influence of the variation by the edge effect. In the case of FIG. 15, upon completion of the virtual dot growing in the halftone spot area A, the virtual dot starts to grow in the additional halftone spot B. Accordingly, the size of the virtual dot area of the halftone spot area A does not change at a boundary where the gradation level changes to another. As a result, it is greatly affected by the variation by the edge effect.

FIG. 29 is a diagram for showing a look-up table used for the fourth halftone spot growing process. Diagrams of (1) and (2) in FIG. 29 are the same as those of (1) and (2) in FIG. 23. A look-up table group used for the fourth halftone spot growing process is shown in (3) in FIG. 29.

Look-up tables of the first pixels A-1, B-1, C-1, the second pixels A-2, B-2, C-2, and the fifth pixels A-5 of the halftone spot areas are shown, by way of example, in the look-up table group. The gradation levels from 0 to "i−1" of the input gradation data are assigned to the step S1A. In this step, in the look-up table of the first pixel A-1 of the halftone spot of the first halftone spot group, the output value representative of the size of the virtual dot area is incremented from 0 to 255 (input and output data, each consisting of 8 bits). In the look-up table of the first pixel B-1 of the halftone spot of the second halftone spot group, the output data of the virtual dot area starts to increment in the middle of the step.

The input values from i to "j−1" as t assigned to the step S2A. In the look-up table of the first pixel B-1 of the halftone spot of the second halftone spot group, a virtual dot area starts to increase in the first pixel C-1 of the halftone spot of the third halftone spot group during the incrementing of the virtual dot size output value to 255.

The input values from j to "k−1" are assigned to the step S3A, and in this step, the output value representative of the size of the virtual dot area is incremented to the maximum value 255 in the look-up table of the first pixel C-1 of the halftone spot of the third halftone spots group. The input value k or larger are assigned to the step S4 and the subsequent ones. In the look-up tables or the second pixels A-2, B-2, C-2 of the halftone spots of the first to third halftone spot groups, the output values of the sizes of the virtual dot areas are incremented simultaneously. At the boundary between the steps S3A and S4, the halftone spot density does not change. Hence, there is no variation by the edge effect.

Figure 30:
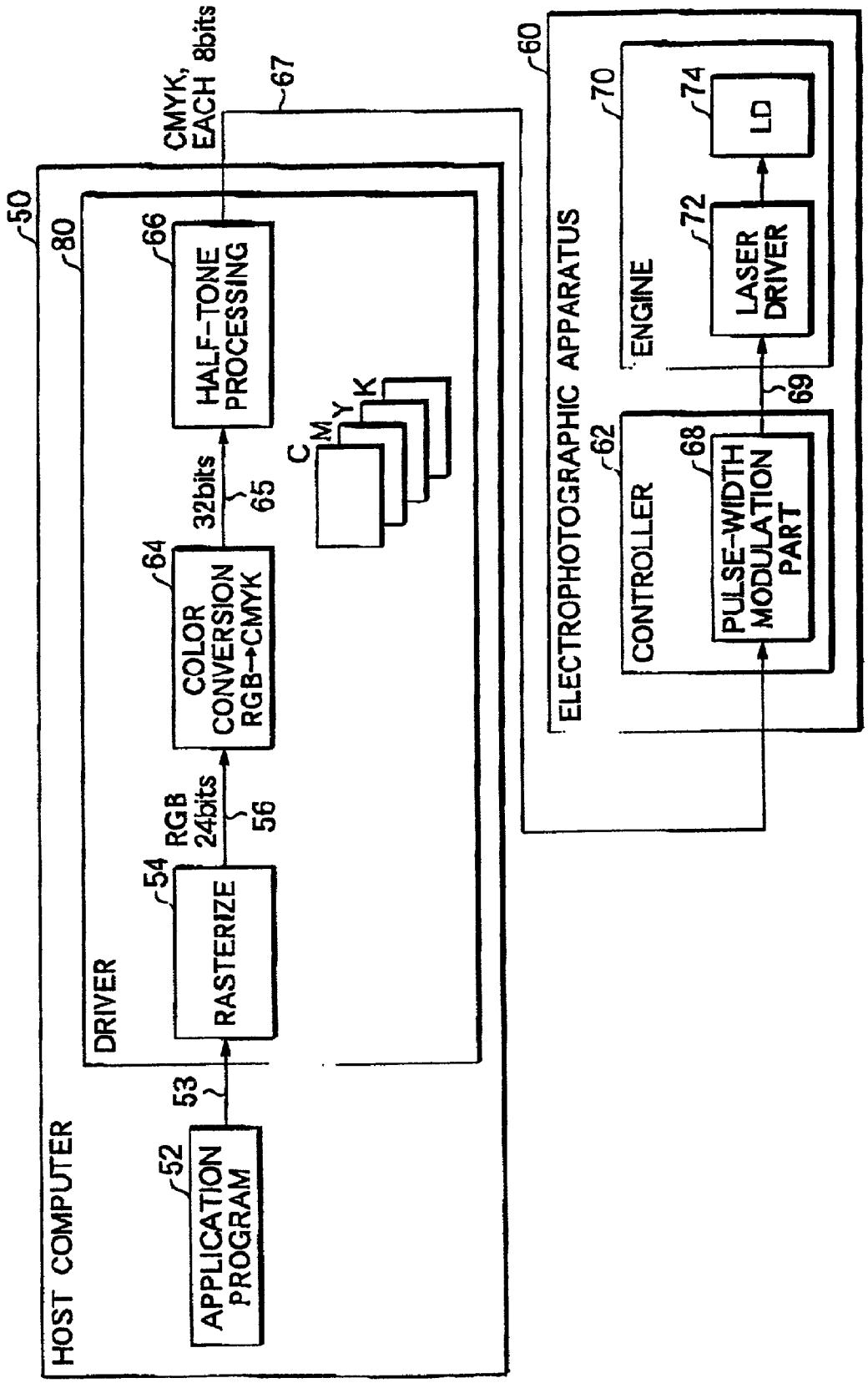
FIG. 30 is a block diagram showing an overall system of another electrophotographic apparatus.

FIG. 30 is a block diagram showing an overall system configuration of another electrophotographic systems. In the electrophotographic system shown in FIG. 3, the controller 62 in the electrophotographic apparatus 60, such as printer, includes the halftone processing part 66. The half tone processing part 66, while referring to the look-up tables, converts the input picture image data containing gradation information into the picture reproducing data containing the size of virtual dot areas, and outputs the converted data. In the FIG. 30 system, the halftone processing function is incorporated into a driven program 80, which is installed in a host computer 50. Accordingly, the driver 80 includes a rasterizing module 54, a color converting module 64 and a half tone processing module 66.

The half tone processing part 66 contains LUT matrices and look-up tables the conversion table, and converts the input picture image data containing the gradation information into the picture reproducing data containing the size of the virtual dot areas by referring to the conversion tables. Accordingly, an image processing for carrying out the half-tone process is realized by the program running in the host computer.

This image processing program converts the input picture image data containing the gradation information into the output picture reproducing data containing the virtual dot area data, and during its converting process, the look-up tables in the conversion table are referred to. How to grow halftone spots with increase of the gradation level is described in the look-up tables. Accordingly, the image processing program contains converting procedures and the conversion table.

An electrophotographic apparatus 60 of FIG. 30 includes a controller 62 and an engine 70. The controller 62 includes a pulse-width modulation part 68, which generates a laser drive pulse signal 69 from picture reproducing data 67 after the conversion, The engine 70 includes a laser driver 72 and a laser diode 74.

In the embodiments mentioned above, the halftone spot area is divided into three halftone spot groups. Halftone spots are made to grow successively. It is readily understood that the present invention is applied to a case where evident that the halftone spot area may be divided into two or more number of halftone spot groups, and the halftone spots are made to successively grow. In the embodiments mentioned above, the virtual dots are made to successively grow in the halftone spots of a plurality of halftone spot groups. It is evident that the invention is not limited to such. In an alternative, after the growth nucleus pixel grows, virtual dots simultaneously grow in a plurality of pixels adjacent to one another, while the virtual dot is made to successively grow in the adjacent pixels, in the embodiments described above.

The intention may be applied to a case where picture reproducing data is generated which causes a density of halftone spots to stepwise vary with increase of the gradation level. Accordingly, the invention may be applied not only to the case where the virtual dots successively grow in the halftone spot areas of plurality of halftone spot groups as in the embodiments, but also to the case where the halftone spots are made to grow at a first density in a first data range, and the half tone spots are made to grow at a second density, which is higher than the at a first density, in a second data range of which the gradation level is higher than in the first data range.

As seen from the foregoing description, the gradation of the final picture is properly reproduced, so that the pictures quality is improved.

What is claimed is:

1. A electrophotographic apparatus for reproducing a picture by expressing a gradation of the picture by use of halftone spots which are each formed by dot pictures within a plurality of pixels, said electrophotographic apparatus comprising:
   a picture reproducing engine for forming the dot pictures by attaching toner to virtual dot areas each within the pixel; and
   an image processing unit for causing (i) growth of halftone spots of a first group in a first data range of input image data to increase a gradation of the dot picture, and (ii) growth of halftone spots of a second group in a second data range of the input image data, which is adjacent to higher gradation level side of said first data range to further increase the gradation of the dot pictures;
   wherein a density of the halftone spots of said second data range is larger than a density of the halftone spots of said first data range, and
   wherein said image processing unit generates virtual dots small enough to fail to form dot pictures of toner in halftone spot areas other than said halftone spots of said first group in said first data range of the input image data.

2. An image processing apparatus according to claim 1, wherein the gradation of the dot pictures is simply increased by said image processing unit without decrease at a boundary between said first and second data ranges.

3. An image processing method for reproducing a picture by expressing a gradation of the picture by use of halftone spots which are each formed by dot pictures within a plurality of pixels, said image processing method comprising steps of:
   growing halftone spots of a first group in a first data range of input image data to increase a gradation of the dot pictures;
   growing halftone spots of a second group in a second data range of the input image data, which is adjacent to higher gradation level side of said fist data range to further increase the gradation of the dot pictures,
   wherein a density of the halftone spots of said second data range is larger than a density of the halftone spots of said first data range; and
   generating virtual dots small enough to fail to form dot pictures of toner in halftone spot areas other than said halftone spots of said first group in said first data range of the input image data.

4. An image processing method according to claim 3, wherein the gradation of the dot pictures is simply increased by said image processing unit without decrease at a boundary between said first and second data ranges.

5. An electrophotographic apparatus for reproducing a picture by expressing a gradation of the picture by use of halftone spots which are each formed by dot pictures within a plurality of pixels, said electrophotographic apparatus comprising:
   a picture reproducing engine for forming the dot pictures by attaching toner to virtual dot areas each within the pixel; and
   an image processing for causing (i) growth of halftone spots of a first group in a first data range of input image data to increase a gradation of the dot pictures, and (ii) growth of halftone spots of a second group in a second data range of the input image data, which is adjacent to higher gradation level side of said first data range to further increase the gradation of the dot pictures;
   wherein said image processing unit generates virtual dots small enough to fail to form dot pictures of toner in halftone spot areas other than said halftone spots of said first group in said first data range of the input image data.

6. An electrophotographic apparatus for reproducing a picture by expressing a gradation of the picture by use of halftone spots which are each formed by dot pictures within a plurality of pixels, said electrophotographic apparatus comprising:

a picture reproducing engine for forming the dot pictures by attaching toner to virtual dot areas each within the pixel; and an image processing unit for causing (i) growth of halftone spots of a first group in a first data range of input image data to increase a gradation of the dot pictures, and (ii) growth of halftone spots of a second group in a second data range of the input image data, which is adjacent to higher gradation level side of said first data range to further increase the gradation of the dot pictures;

wherein halftone spots of said second group start to grow during the growth of halftone sports of said first group in said first data range of the input image data.

7. A electrophotographic apparatus for reproducing a picture by expressing a gradation of the picture by use of halftone spots which are each formed by dot pictures within a plurality of pixels, said electrophotographic apparatus comprising:

a picture reproducing engine for forming the dot pictures by attaching toner to virtual dot areas each within the pixel; and an image processing unit for causing (i) growth of halftone spots of a first group in a first data range of input image data to increase a gradation of the dot picture, and (ii) growth of halftone spots of a second group in a second data range of the input image data, which is adjacent to higher gradation level side of said first data range to further increase the gradation of the dot pictures;

wherein a density of the halftone spots of said second data range is larger than a density of the halftone spots of said first data range, and wherein halftone spots of said second group start to grow during the growth of halftone spots of said first group in said first data range of the input image data.

8. An electrophotographic apparatus according to claim 7, wherein the growth of halftone spots of said first group stops during the growth of halftone spots of said second group.

9. An image processing apparatus according to claim 7, wherein the gradation of the dot pictures is simply increased by said image processing unit without decrease at a boundary between said first and second data ranges.

10. An image processing method for reproducing a picture by expressing a gradation of the picture by use of halftone spots which are each formed by dot pictures within a plurality of pixels, said image processing method comprising steps of:

growing halftone spots of a first group in a first data range of input image data to increase a gradation of the dot pictures; and growing halftone spots of a second group in a second data range of the input image data, which is adjacent to higher gradation level side of said fist data range to further increase the gradation of the dot pictures, wherein a density of the halftone spots of said second data range is larger than a density of the halftone spots of said first data range, and wherein halftone spots of said second group start to grow during the growth of halftone spots of said first group in said first data range of the input image data.

11. An image processing method according to claim 10, wherein the growth of halftone spots of said first group stops during the growth of halftone spots of said second group.

12. An image processing method according to claim 10, wherein the gradation of the dot pictures is simply increased by said image processing unit without decrease at a boundary between said first and second data ranges.

* * * * *